(12) United States Patent
Abotabl et al.

(10) Patent No.: US 12,335,883 B2
(45) Date of Patent: Jun. 17, 2025

(54) SSB REPETITION IN FREQUENCY DOMAIN

(71) Applicant: QUALCOMM Incorporated, San Diego, CA (US)

(72) Inventors: Ahmed Attia Abotabl, San Diego, CA (US); Hung Dinh Ly, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 441 days.

(21) Appl. No.: 17/727,652

(22) Filed: Apr. 22, 2022

(65) Prior Publication Data

US 2023/0345391 A1 Oct. 26, 2023

(51) Int. Cl.
*H04W 56/00* (2009.01)
*H04W 16/28* (2009.01)
*H04W 24/08* (2009.01)

(52) U.S. Cl.
CPC ......... *H04W 56/001* (2013.01); *H04W 16/28* (2013.01); *H04W 24/08* (2013.01)

(58) Field of Classification Search
CPC ... H04W 56/001; H04W 16/28; H04W 24/08; H04B 7/06952
See application file for complete search history.

(56) References Cited

U.S. PATENT DOCUMENTS

| | | | | |
|---|---|---|---|---|
| 2020/0021946 A1* | 1/2020 | Kumar | ................ | G01S 1/0428 |
| 2020/0022040 A1* | 1/2020 | Chen | ................ | H04W 36/0085 |
| 2020/0252891 A1* | 8/2020 | Chendamarai Kannan | ................ | H04W 74/0808 |
| 2020/0344815 A1* | 10/2020 | Svedman | .......... | H04W 74/0891 |
| 2021/0067978 A1* | 3/2021 | Cheraghi | ............. | H04B 17/336 |
| 2021/0289455 A1* | 9/2021 | Sun | ........................ | H04L 5/0051 |
| 2021/0329579 A1* | 10/2021 | Sakhnini | ........... | H04W 56/0015 |
| 2021/0337489 A1* | 10/2021 | Abotabl | ................... | H04L 5/14 |
| 2022/0046724 A1* | 2/2022 | Maso | ................ | H04W 74/0841 |
| 2022/0078735 A1 | 3/2022 | Saggar et al. | | |
| 2022/0338140 A1* | 10/2022 | Zhang | ................... | H04L 5/0092 |
| 2023/0060015 A1* | 2/2023 | Liu | .................... | H04W 72/1268 |
| 2023/0085104 A1* | 3/2023 | Park | .................... | H04W 74/004 370/329 |
| 2023/0130003 A1* | 4/2023 | Ali | ..................... | H04B 7/15528 370/329 |
| 2024/0049154 A1* | 2/2024 | Svendsen | .............. | H04L 5/0048 |

OTHER PUBLICATIONS

International Search Report and Written Opinion—PCT/US2023/016135—ISA/EPO—Jun. 20, 2023.

* cited by examiner

*Primary Examiner* — Kan Yuen
(74) *Attorney, Agent, or Firm* — Holland & Hart LLP/Qualcomm Incorporated

(57) ABSTRACT

Methods, systems, and devices for wireless communications are described. A user equipment (UE) may receive, from a network entity, control signaling that indicates a sweeping pattern for multiple synchronization signal blocks (SSBs), which repeats over multiple time periods. The multiple SSBs may be multiplexed across a time domain and a frequency domain. The UE may monitor for two or more SSBs that are multiplexed across the time domain and the frequency domain during a time period of the multiple time periods and within an activated bandwidth part. The UE may transmit, to the network entity, an indication of one of the multiple SSBs to facilitate further communications.

26 Claims, 20 Drawing Sheets

SSB REPETITION IN FREQUENCY DOMAIN

FIELD OF TECHNOLOGY

The following relates to wireless communications, including SSB repetition in frequency domain.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE).

SUMMARY

Generally, the described techniques provide procedures for sweeping synchronization signal block (SSB) transmissions in the time and frequency domains. The techniques enable a network entity to have longer sleep times between SSB beam sweeping occasions. For example, a user equipment (UE) may receive, from the network entity, control signaling that indicates a sweeping pattern for multiple SSBs, which repeats over multiple time periods. In some cases, the multiple SSBs may be multiplexed across a time domain (e.g., time division multiplexed (TDM)) and a frequency domain (e.g., frequency division multiplexed (FDM)). The UE may monitor for two or more SSBs that are multiplexed across the time domain and the frequency domain during a time period of the multiple time periods and within an activated bandwidth part. The UE may transmit, to the network entity, an indication of one of the multiple SSBs to facilitate further communications. In some examples, the sweeping pattern may be applied to a subset of SSB occasions, such that some SSB occasions may include both TDM and FDM SSBs and some other SSB occasions may include TDM SSBs. In some cases, the control signaling may indicate a muting pattern associated with the sweeping pattern, where the muting pattern indicates one or more SSBs to mute in the frequency domain, the time domain, or both. In some examples, the sweeping pattern, the muting pattern, a number of repetitions and repetition periodicity associated with the sweeping pattern, or any combination thereof, may be associated with another cell (e.g., another network entity).

A method for wireless communication at a UE is described. The method may include receiving, from a network entity, control signaling that indicates a sweeping pattern for a set of multiple SSBs that are multiplexed across a time domain and a frequency domain, and that indicates a first set of multiple time periods over which the sweeping pattern repeats, monitoring, during a first time period of the first set of multiple time periods, two or more SSBs multiplexed across the time domain and the frequency domain in accordance with the sweeping pattern, and transmitting, to the network entity, an indication of a SSB of the set of multiple SSBs based on the monitoring.

An apparatus for wireless communication is described. The apparatus may include a memory, a transceiver, and at least one processor of a UE, the at least one processor coupled with the memory and the transceiver. The at least one processor may be configured to receive, from a network entity, control signaling that indicates a sweeping pattern for a set of multiple SSBs that are multiplexed across a time domain and a frequency domain, and that indicates a first set of multiple time periods over which the sweeping pattern repeats, monitor, during a first time period of the first set of multiple time periods, two or more SSBs multiplexed across the time domain and the frequency domain in accordance with the sweeping pattern, and transmit, to the network entity, an indication of a SSB of the set of multiple SSBs based on the monitoring.

Another apparatus for wireless communication at a UE is described. The apparatus may include means for receiving, from a network entity, control signaling that indicates a sweeping pattern for a set of multiple SSBs that are multiplexed across a time domain and a frequency domain, and that indicates a first set of multiple time periods over which the sweeping pattern repeats, means for monitoring, during a first time period of the first set of multiple time periods, two or more SSBs multiplexed across the time domain and the frequency domain in accordance with the sweeping pattern, and means for transmitting, to the network entity, an indication of a SSB of the set of multiple SSBs based on the monitoring.

A non-transitory computer-readable medium storing code for wireless communication at a UE is described. The code may include instructions executable by a processor to receive, from a network entity, control signaling that indicates a sweeping pattern for a set of multiple SSBs that are multiplexed across a time domain and a frequency domain, and that indicates a first set of multiple time periods over which the sweeping pattern repeats, monitor, during a first time period of the first set of multiple time periods, two or more SSBs multiplexed across the time domain and the frequency domain in accordance with the sweeping pattern, and transmit, to the network entity, an indication of a SSB of the set of multiple SSBs based on the monitoring.

In some examples of the method, apparatuses, and non-transitory computer-readable medium described herein, receiving the control signaling may include operations, features, means, or instructions for receiving an indication of a first set of SSBs of the set of multiple SSBs that may be multiplexed across the time domain and the frequency domain in the first set of multiple time periods and a second set of SSBs of the set of multiple SSBs may be multiplexed across the time domain in a second set of multiple time periods.

In some examples of the method, apparatuses, and non-transitory computer-readable medium described herein, receiving the control signaling may include operations, features, means, or instructions for receiving an indication that a first SSB of the two or more SSBs may be repeated during the first time period of the first set of multiple time periods.

In some examples of the method, apparatuses, and non-transitory computer-readable medium described herein, receiving the control signaling may include operations, features, means, or instructions for receiving an indication of a muting pattern that indicates to mute a first SSB of the set of multiple SSBs and to mute each repetition of the first SSB.

In some examples of the method, apparatuses, and non-transitory computer-readable medium described herein, receiving the control signaling may include operations, features, means, or instructions for receiving an indication of a muting pattern that indicates to mute a first SSB of the set of multiple SSBs and to monitor for each repetition of the first SSB.

In some examples of the method, apparatuses, and non-transitory computer-readable medium described herein, receiving the control signaling may include operations, features, means, or instructions for receiving an indication of a muting pattern for a repetition of a first SSB of the set of multiple SSBs.

Some examples of the method, apparatuses, and non-transitory computer-readable medium described herein may further include operations, features, means, or instructions for transmitting a random access message during one of a first random access occasion associated with a first SSB of the two or more SSBs or a second random access occasion associated with a repetition of the first SSB.

Some examples of the method, apparatuses, and non-transitory computer-readable medium described herein may further include operations, features, means, or instructions for transmitting a random access message during a random access occasion that may be associated with each of a first SSB of the two or more SSBs and a repetition of the first SSB.

In some examples of the method, apparatuses, and non-transitory computer-readable medium described herein, receiving the control signaling may include operations, features, means, or instructions for receiving, from the network entity of a first cell, the control signaling associated with a second network entity of a second cell, where the control signaling indicates a number of SSB repetitions, a periodicity of SSB repetitions, a muting pattern, or any combination thereof.

Some examples of the method, apparatuses, and non-transitory computer-readable medium described herein may further include operations, features, means, or instructions for receiving, from the network entity, a message indicating a bandwidth part for monitoring the two or more SSBs and monitoring a subset of the two or more SSBs that occur within the bandwidth part.

A method for wireless communication at a network entity is described. The method may include transmitting, to a UE, control signaling that indicates a sweeping pattern for a set of multiple SSBs that are multiplexed across a time domain and a frequency domain, and that indicates a first set of multiple time periods over which the sweeping pattern repeats, transmitting, to the UE during a first time period of the first set of multiple time periods, two or more SSBs multiplexed across the time domain and the frequency domain based on the sweeping pattern, and receiving, from the UE, an indication of a SSB of the set of multiple SSBs based on the outputted two or more SSBs.

An apparatus for wireless communication is described. The apparatus may include a memory and at least one processor of a network entity, the at least one processor coupled with the memory. The at least one processor may be configured to transmit, to a UE, control signaling that indicates a sweeping pattern for a set of multiple SSBs that are multiplexed across a time domain and a frequency domain, and that indicates a first set of multiple time periods over which the sweeping pattern repeats, transmit, to the UE during a first time period of the first set of multiple time periods, two or more SSBs multiplexed across the time domain and the frequency domain based on the sweeping pattern, and receive, from the UE, an indication of a SSB of the set of multiple SSBs based on the outputted two or more SSBs.

Another apparatus for wireless communication at a network entity is described. The apparatus may include means for transmitting, to a UE, control signaling that indicates a sweeping pattern for a set of multiple SSBs that are multiplexed across a time domain and a frequency domain, and that indicates a first set of multiple time periods over which the sweeping pattern repeats, means for transmitting, to the UE during a first time period of the first set of multiple time periods, two or more SSBs multiplexed across the time domain and the frequency domain based on the sweeping pattern, and means for receiving, from the UE, an indication of a SSB of the set of multiple SSBs based on the outputted two or more SSBs.

A non-transitory computer-readable medium storing code for wireless communication at a network entity is described. The code may include instructions executable by a processor to transmit, to a UE, control signaling that indicates a sweeping pattern for a set of multiple SSBs that are multiplexed across a time domain and a frequency domain, and that indicates a first set of multiple time periods over which the sweeping pattern repeats, transmit, to the UE during a first time period of the first set of multiple time periods, two or more SSBs multiplexed across the time domain and the frequency domain based on the sweeping pattern, and receive, from the UE, an indication of a SSB of the set of multiple SSBs based on the outputted two or more SSBs.

In some examples of the method, apparatuses, and non-transitory computer-readable medium described herein, transmitting the control signaling may include operations, features, means, or instructions for transmitting an indication of a first set of SSBs of the set of multiple SSBs that may be multiplexed across the time domain and the frequency domain in the first set of multiple time periods and a second set of SSBs of the set of multiple SSBs may be multiplexed across the time domain in a second set of multiple time periods.

In some examples of the method, apparatuses, and non-transitory computer-readable medium described herein, transmitting the control signaling may include operations, features, means, or instructions for transmitting an indication that a first SSB of the two or more SSBs may be repeated during the first time period of the first set of multiple time periods.

In some examples of the method, apparatuses, and non-transitory computer-readable medium described herein, transmitting the control signaling may include operations, features, means, or instructions for transmitting an indication of a muting pattern that indicates to mute a first SSB of the set of multiple SSBs and to mute each repetition of the first SSB.

In some examples of the method, apparatuses, and non-transitory computer-readable medium described herein, transmitting the control signaling may include operations, features, means, or instructions for transmitting an indication of a muting pattern that indicates to mute a first SSB of the set of multiple SSBs and to monitor for each repetition of the first SSB.

In some examples of the method, apparatuses, and non-transitory computer-readable medium described herein, transmitting the control signaling may include operations, features, means, or instructions for transmitting an indication of a muting pattern for a repetition of a first SSB of the set of multiple SSBs.

Some examples of the method, apparatuses, and non-transitory computer-readable medium described herein may further include operations, features, means, or instructions for receiving a random access message during one of a first random access occasion associated with a first SSB of the two or more SSBs or a second random access occasion associated with a repetition of the first SSB.

Some examples of the method, apparatuses, and non-transitory computer-readable medium described herein may further include operations, features, means, or instructions for receiving a random access message during a random access occasion that may be associated with each of a first SSB of the two or more SSBs and a repetition of the first SSB.

Some examples of the method, apparatuses, and non-transitory computer-readable medium described herein may further include operations, features, means, or instructions for performing a rest procedure for a set of time periods preceded by the first time period based on the two or more SSBs.

In some examples of the method, apparatuses, and non-transitory computer-readable medium described herein, transmitting the control signaling may include operations, features, means, or instructions for transmitting, from the network entity of a first cell, the control signaling associated with a second network entity of a second cell, where the control signaling indicates a number of SSB repetitions, a periodicity of SSB repetitions, a muting pattern, or any combination thereof.

Some examples of the method, apparatuses, and non-transitory computer-readable medium described herein may further include operations, features, means, or instructions for transmitting, to the UE, a message indicating a bandwidth part for monitoring the two or more SSBs, where a subset of the two or more SSBs occur within the bandwidth part.

DETAILED DESCRIPTION

Figure 1:
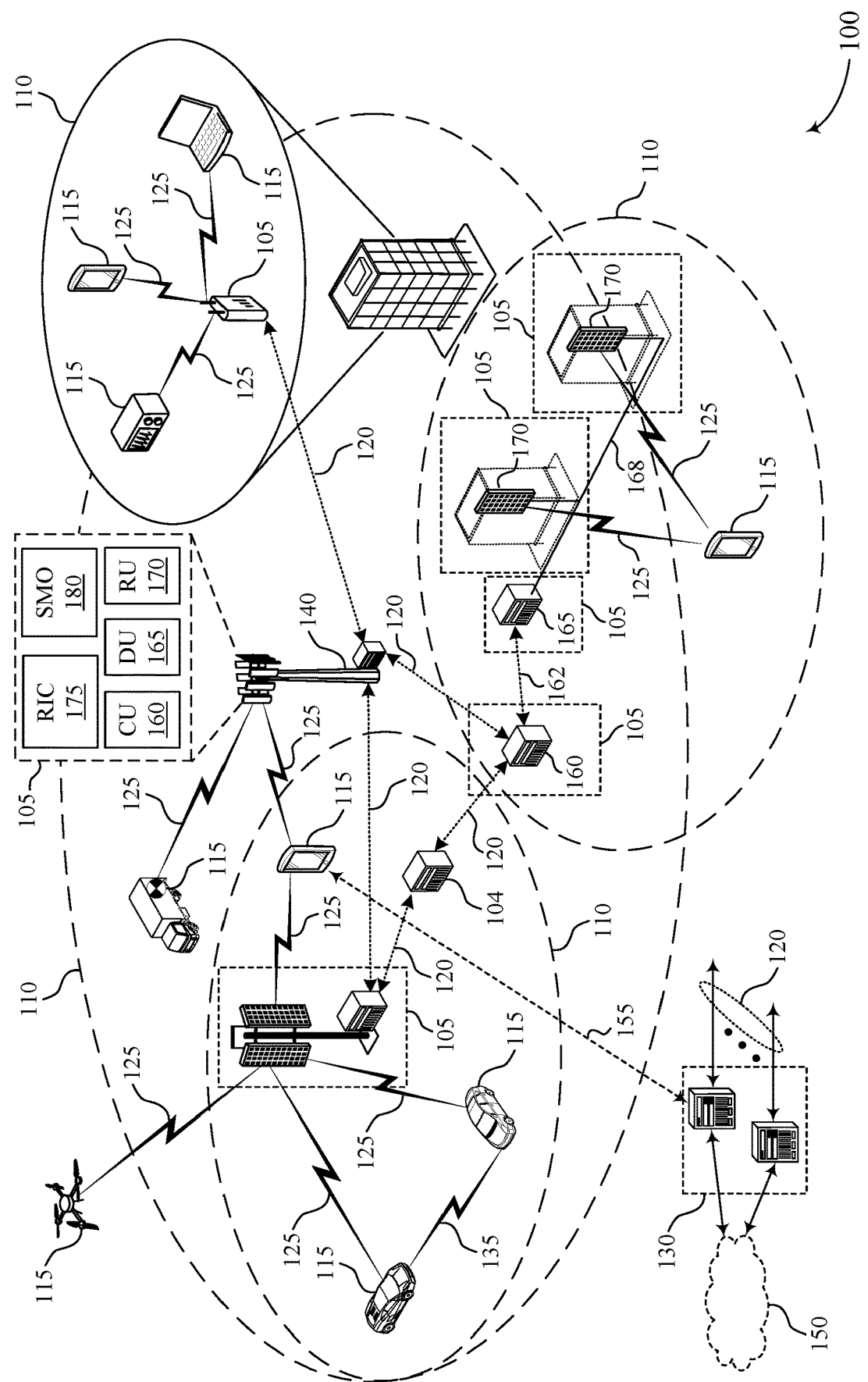
FIGS. 1 and 2 illustrate examples of wireless communications systems that support SSB repetition in frequency domain in accordance with one or more aspects of the present disclosure.

In some wireless communications, a network entity, such as a base station, may consume a large amount of power. For example, a power consumption associated with the network entity may be proportional to an amount of time that the network entity is actively communicating (e.g., performing downlink and uplink transmissions). In some cases, some synchronization signal block (SSB) beam sweeping procedures may include a network entity transmitting SSBs over long time periods and thus consuming a large amount of power. For example, the network entity may indicate to a user equipment (UE) multiple SSBs. In some cases, the multiple SSBs may be time division multiplexed (TDM) over multiple time periods. For example, a first SSB (SSB0) may occupy a first time period, a second SSB (SSB1) may occupy a second time period, etc., for each SSB. Because the beam sweeping procedures utilize multiple SSBs over multiple time periods, the power consumption associated with the beam sweeping procedures may be very large (e.g., for a high number of SSBs). In some cases, techniques associated with power saving for the network entity may include increasing periods of time that the network entity refrains from communicating (e.g., a frequency and/or a length of sleep time), but such techniques may impact UE initial access and mobility. To increase the periods of sleep time for a network entity, SSB beam sweeping procedures may be updated.

The techniques described herein provide techniques for sweeping SSB transmissions in both time and frequency domains, thereby reducing the duration of time a network entity is communicating SSBs and enabling the network entity to have longer sleep times between SSB beam sweeping occasions. For example, a UE may receive, from the network entity, control signaling that indicates a sweeping pattern for multiple SSBs, which repeats over multiple time periods. In some cases, the multiple SSBs may be multiplexed across a time domain (e.g., TDM) and a frequency domain (e.g., frequency division multiplexed (FDM)). The UE may monitor for two or more SSBs that are multiplexed across the time domain and the frequency domain during a time period of the multiple time periods and within an activated bandwidth part. The UE may transmit, to the network entity, an indication of one of the multiple SSBs to facilitate further communications. In some examples, the sweeping pattern may be applied to a subset of SSB occasions, such that some SSB occasions may include both TDM and FDM SSBs and some other SSB occasions may include TDM SSBs. In some cases, the control signaling may indicate a muting pattern associated with the sweeping pattern, where the muting pattern indicates one or more SSBs to mute in the frequency domain, the time domain, or both. In some examples, the sweeping pattern, the muting pattern, a number of repetitions and repetition periodicity associated with the sweeping pattern, or any combination thereof, may be associated with another cell (e.g., another network entity).

Aspects of the disclosure are initially described in the context of wireless communications systems. Aspects of the disclosure are further described in the context of multiple configurations and a process flow diagram. Aspects of the disclosure are further illustrated by and described with reference to apparatus diagrams, system diagrams, and flowcharts that relate to SSB repetition in frequency domain.

FIG. 1 illustrates an example of a wireless communications system 100 that supports SSB repetition in frequency domain in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support SSB repetition in frequency domain as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of TDM techniques, FDM techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, a network entity 105 may consume a large amount of power. For example, a power consumption associated with the network entity may be proportional to downlink transmission and transmission time. To save power, network power saving procedures may be considered. For example, network power saving may take different modes and operations to save power and maintain network operation. In some examples, the network entity 105 may switch power modes according to network input and current traffic conditions. In such examples, the network may not activate a portion or all antennas of the network entity 105 based on low traffic conditions, which may result in a reduced power consumption of the network entity. In some cases, different power modes may include adapting bandwidth (e.g., frequency and time resources) associated with communications of the network entity 105 and a number of active antennas.

In some examples, a UE 115 may receive synchronization signals (e.g., SSBs) during an initial access procedure, connection procedure (e.g., RRC connect), or periodically, among other examples. Some SSB procedures may include a network entity transmitting SSBs over long time periods and thus consuming a large amount of power. For example, the some SSB procedures may include SSBs that are TDM over multiple time periods. For example, an SSB procedure with a high number of SSBs (e.g., eight in frequency range one (FR1)) and low subcarrier spacing (e.g., 15 kilohertz (kHz) in FR1) may occupy a long time footprint.

In some cases, techniques associated with power saving for the network 105 entity may include increasing periods of time that the network entity 105 refrains from communicating (e.g., a frequency and/or a length of sleep time). An example of a power saving technique may include turning off some SSBs to open up more network entity sleep time. However, such techniques may impact UE initial access and mobility. In addition, SSB coverage may be reduced in order to cover the off SSB coverage. Techniques described herein may indicate SSB beam sweeping in time and frequency domains, which may result in mitigating impact to UE initial access and mobility when some SSBs are turned off.

In some examples, a UE 115 may receive, from the network entity 105, control signaling that indicates a sweeping pattern for multiple SSBs, which repeats over multiple time periods. In some cases, the multiple SSBs may be multiplexed across a time domain (e.g., TDM) and a frequency domain (e.g., FDM). The UE 115 may monitor for two or more SSBs that are multiplexed across the time domain and the frequency domain during a time period of the multiple time periods and within an activated bandwidth part. The UE 115 may transmit, to the network entity 105, an indication of one of the multiple SSBs to facilitate further communications. In some examples, the sweeping pattern may be applied to a subset of SSB occasions, such that some SSB occasions may include both TDM and FDM SSBs and some other SSB occasions may include TDM SSBs. In some cases, the control signaling may indicate a muting pattern associated with the sweeping pattern, where the muting pattern indicates one or more SSBs to mute in the frequency domain, the time domain, or both. In some examples, the sweeping pattern, the muting pattern, a number of repetitions and repetition periodicity associated with the sweeping pattern, or any combination thereof, may be associated with another cell (e.g., another network entity 105).

Figure 2:
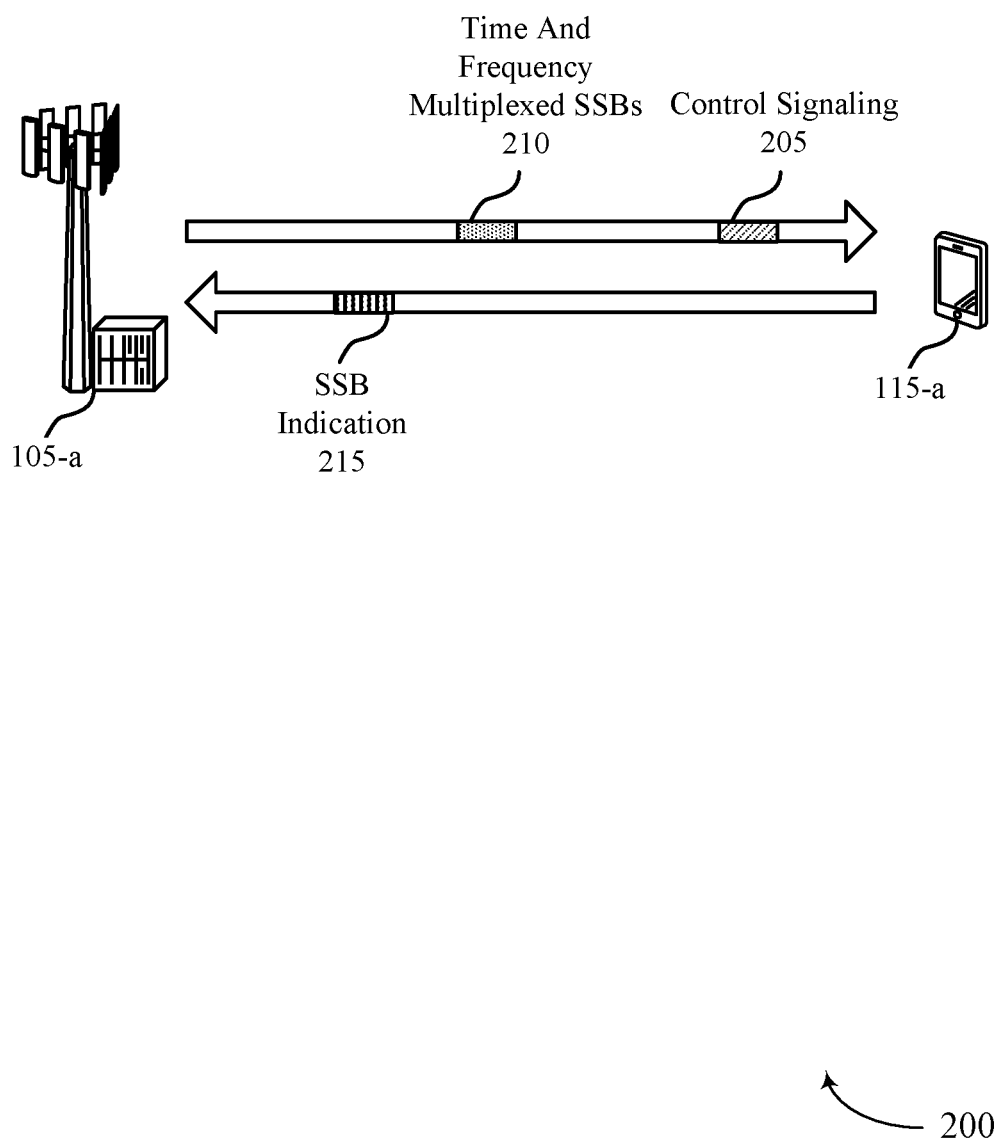

FIG. 2 illustrates an example of a wireless communications system 200 that supports sweeping SSB transmissions in both time and frequency domains in accordance with one or more aspects of the present disclosure. In some examples, the wireless communications system 200 may implement aspects of the wireless communications system 100. For example, the wireless communications system 200 may include a network entity 105-a, and a UE 115-a, which may be examples of a network entity 105 and a UE 115 respectively, as described herein with reference to FIG. 1. The network entity 105-a and the UE 115-a may be in wireless communication.

In some examples, some SSB beam sweeping procedures may consume a large amount of power. For example, an SSB beam sweeping procedure may utilize multiple SSBs over multiple time periods. To help mitigate the amount of power consumed by the SSB beam sweeping procedure, the network entity 105-a may provide configurations for sweeping SSB transmissions in both time and frequency domains. For example, the network entity 105-a may transmit control signaling 205 (e.g., an RRC, a medium access control-control element (MAC-CE), or downlink control information (DCI)) to the UE 115-a. In some cases, the control signaling may indicate, to the UE 115-a, a sweeping pattern for multiple SSBs that are multiplexed across time and frequency domains.

In some cases, the sweeping pattern may include an indication of a subset of SSBs multiplexed across the time domain and the frequency domain and a subset of SSBs multiplexed across the time domain. For example, a first SSB and a second SSB of a set of SSBs (e.g., a period of SSBs) may be multiplexed across both the time domain and the frequency domain. A third SSB and a fourth SSB of the same set of SSBs may be multiplexed across the time domain. It is understood that this example is provided for purposes of discussion and illustration only, and numerous different patterns with different numbers of SSBs may be possible. In some cases, the network entity 105-a may transmit, to the UE 115-a, signaling including time and frequency multiplexed SSBs 210 that comprise a set of SSBs multiplexed according to the sweeping pattern.

In some examples, the network entity 105-*a* may be associated with a first cell and may provide the UE 115-*a* with SSB repetition or SSB sweeping configurations (e.g., a sweeping pattern) associated with a second cell. For example, in a multiple carrier scenario (e.g., CA or NR DC), the network entity 105-*a* may be associated with a primary cell (PCell). In some cases, the PCell may provide configuration to the UE 115-*a* for a secondary cell (SCell). For example, the network entity 105-*a* may transmit, to the UE 115-*a*, the control signaling 205 on the PCell indicating a number of SSB repetitions, a repetition pattern (e.g., a sweeping pattern), repetition periodicity, a muting pattern, or any combination thereof, for the SCell. In some examples, the UE 115-*a* may receive the control signaling 205 and monitor for multiple SSBs according to the indicated sweeping pattern and other configurations.

In some cases, the sweeping pattern may be useful for the UE 115-*a* after an initial access. For example, the UE 115-*a* may monitor for SSBs according to the sweeping pattern and perform measurements (e.g., channel strength, transmit power, channel quality, etc.) on each SSB to facilitate continued communication with the network entity 105-*a* on a desired beam after being connected to the network entity 105-*a*. Additionally, or alternatively, the UE 115-*a* may monitor for SSBs according to the sweeping pattern and determine a desired random access occasion (RO) associated with one or more SSBs as part of a random access procedure (e.g., when a beam failure is detected), as described herein with reference to FIG. 7.

In some cases, the UE 115-*a* may transmit an SSB indication 215 to the network entity 105-*a*. The SSB indication 215 may indicate, to the network entity 105-*a*, an SSB occasion associated with a desired beam (e.g., best beam). For example, the SSB indication 215 may indicate an SSB occasion associated with a desired RO and/or desired channel measurements.

In some examples, the sweeping pattern may be applicable to FR1. For example, in higher frequency ranges (e.g., frequency range two (FR2)) an analog beamforming scheme may be implemented. The analog beamforming scheme may inhibit transmission of different SSBs on different frequency ranges of different beams (e.g., only allowing the different SSBs to be transmitted on a same beam). Due to this technical difficulty, sweeping SSB transmissions in both time and frequency domains may be challenging.

Figure 3:
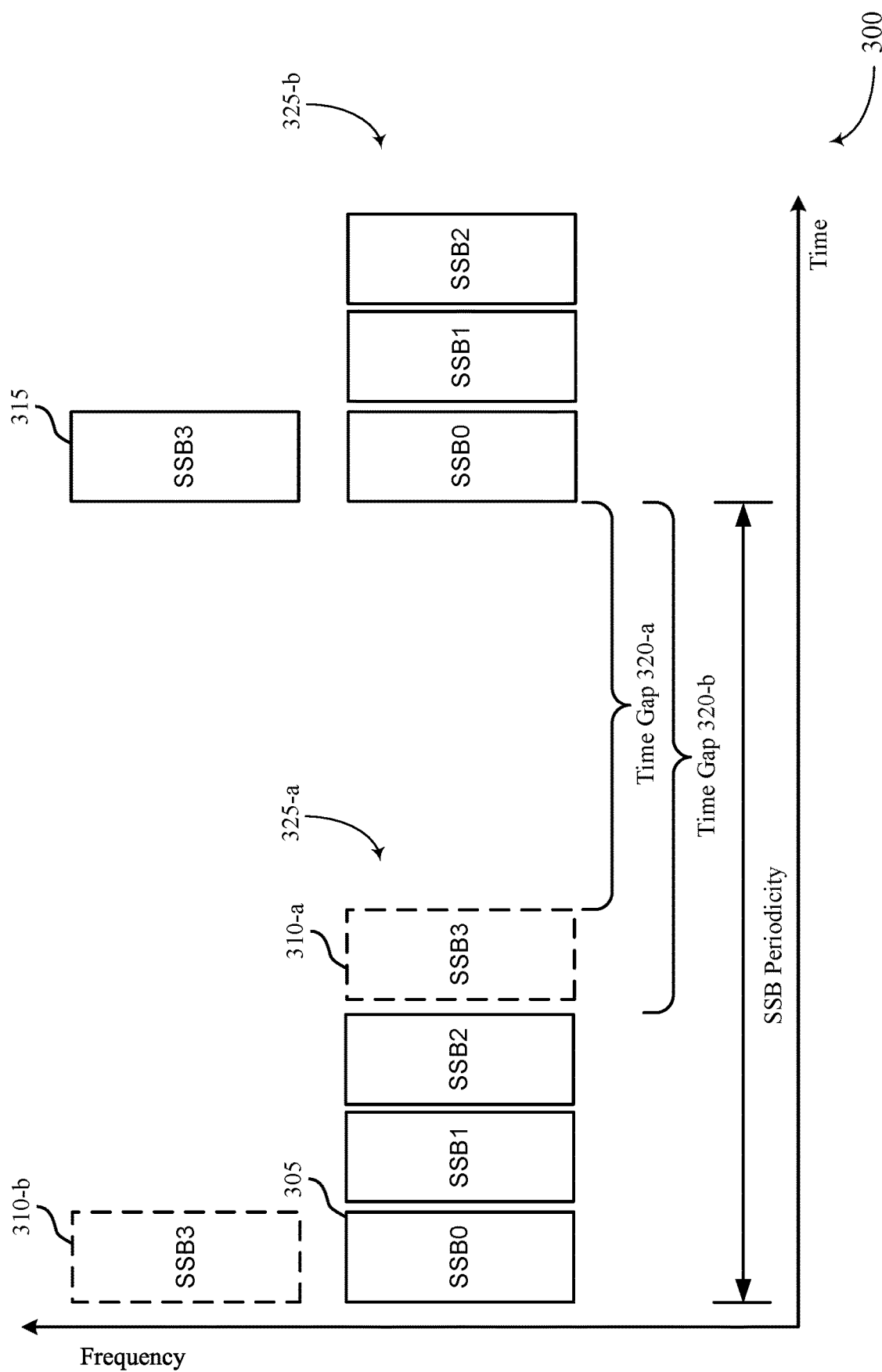
FIG. 3 illustrates an example of a configuration that supports SSB repetition in frequency domain in accordance with one or more aspects of the present disclosure.

FIG. 3 illustrates an example of a configuration 300 that supports sweeping SSB transmissions in both time and frequency domains in accordance with one or more aspects of the present disclosure. In some examples, the configuration 300 may implement or be implemented by aspects of the wireless communications systems 100 and 200 as described herein with reference to FIGS. 1 and 2, respectively. The configuration 300 may include an x-axis associated with time, a y-axis associated with frequency, multiple sets of SSBs (e.g., a first set of SSBs associated with a first SSB pattern 325-*a* and a second set of SSBs associated with a second SSB pattern 325-*b*), which may be an example of the time and frequency multiplexed SSBs 210, as described herein with reference to FIG. 2. The configuration 300 may further include a time gap 320, which may be an example of a period of time associated with a network entity rest procedure.

In some examples, some SSB beam sweeping procedures may consume a large amount of power. For example, an SSB beam sweeping procedure may utilize multiple SSBs over multiple time periods. To help mitigate the amount of power consumed by the SSB beam sweeping procedure, the configuration 300 (e.g., the first SSB pattern 325-*a* and the second SSB pattern 325-*b*) may be used for sweeping SSB transmissions in both time and frequency domains. For example, the configuration 300 may include the first set of SSBs and the second set of SSBs separated by a time gap 320. The first set of SSBs may include SSB0 305, the SSB3 310-*b*, and optionally the SSB3 310-*a*, among other SSBs (e.g., SSB1 and SSB 2) and the second set of SSBs may include the SSB3 315 among other SSBs (e.g., SSB0, SSB1, SSB2).

In some cases, the first SSB pattern 325-*a* (e.g., a sweeping pattern) may include a pattern of SSBs that are multiplexed in the time domain and the frequency domain. For example, the SSB0 305 and the SSB3 310-*b* may be multiplexed in the time domain and the frequency domain. For example, the SSB0 305 and the SSB3 310-*b* (e.g., a first subset of the first set of SSBs) may overlap during a same TTI and at different frequencies (e.g., using different frequency resources). In some examples, the other SSBs of the first set of SSBs (e.g., a second subset of the first set of SSBs) may be multiplexed in the time domain such that the other SSBs may include separate TTIs. In some examples, the SSB3 310-*a* may be a repetition of the SSB3 310-*b* and may also be multiplexed in the time domain.

Additionally, or alternatively, the second SSB pattern 325-*b* may include a pattern of SSBs that are multiplexed in the time domain and the frequency domain. For example, the SSB3 315 of the second set of SSBs may be multiplexed in the time domain and the frequency domain with another of the SSBs of the second set (e.g., SSB0) in a similar pattern to the first set of SSBs. In some cases, the first SSB pattern 325-*a* and the second SSB pattern 325-*b* are the same pattern (e.g., the same in each time period of the SSB periodicity) of the first SSB pattern 325-*a* may be different from the second SSB pattern 325-*b* (e.g., the patterns vary from time period to time period of the SSB periodicity).

In some examples, the first SSB pattern 325-*a* may result in the time gap 320. For example, in a first scenario (e.g., a legacy SSB pattern), the first SSB pattern 325-*a* may include the SSB3 310-*a* and not the SSB 310-*b* (e.g., only TDM SSBs). The first scenario may result in a time gap 320-*a* (e.g., an amount of time between the last SSB of the first set of SSB and the first SSB of the second set of SSBs) of an SSB periodicity. In a second scenario, the first SSB pattern 325-*a* may include the SSB3 310-*b* (e.g., both TDM and FDM SSBs). By moving the SSB3 310-*b* from a separate time period (e.g., as done in the first scenario) to a shared time period (e.g., multiplexed in both the frequency and time domains) the time gap 320-*b* of the SSB periodicity (e.g., a same SSB periodicity as that including the first set of SSBs in the first scenario) may be a larger gap in time than the time gap 320-*a*. In some cases, a network entity 105 may utilize the longer time gap 320-*b* as a period of sleep time and perform a rest procedure for a portion or the duration of the time gap 320-*b*, thereby reducing the duration of time the network entity 105 is communicating SSBs and reducing the power consumption associated with SSB beam sweeping procedures.

Figure 4:
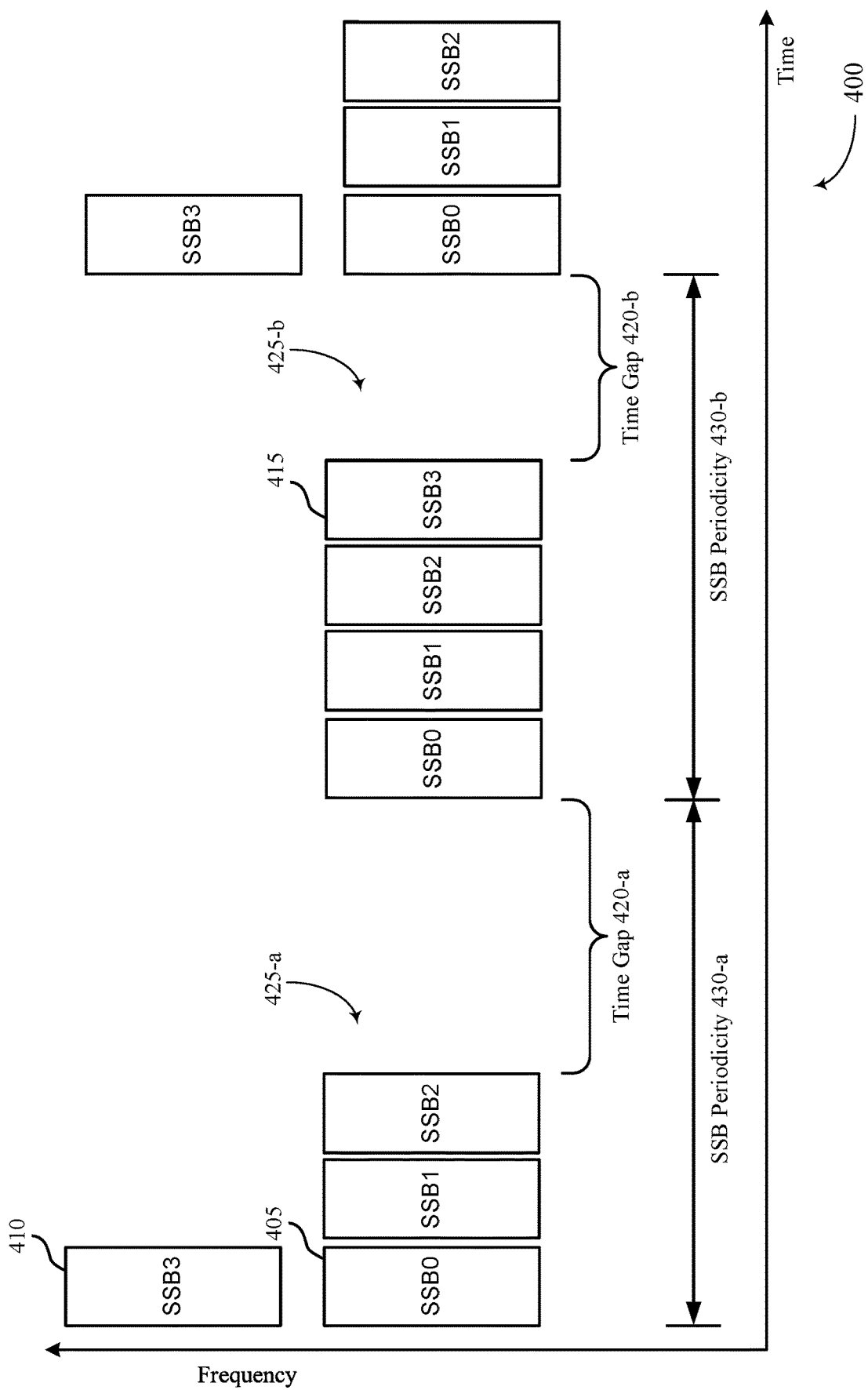
FIG. 4 illustrates an example of a configuration that supports SSB repetition in frequency domain in accordance with one or more aspects of the present disclosure.

FIG. 4 illustrates an example of a configuration 400 that supports sweeping SSB transmissions in both time and frequency domains in accordance with one or more aspects of the present disclosure. In some examples, the configuration 400 may implement or be implemented by aspects of the wireless communications systems 100 and 200 and the configuration 300, as described herein with reference to FIGS. 1-3, respectively. The configuration 400 may include an x-axis associated with time, a y-axis associated with frequency, multiple SSBs (e.g., an SSB0 405, an SSB3 410, and an SSB3 415) at different periodicities, which may be an example of the time and frequency multiplexed SSBs 210, as described herein with reference to FIG. 2. The configuration 400 may further include a time gap 420, which may be an example of a period of time associated with a network entity rest procedure.

In some examples, some SSB beam sweeping procedures may consume a large amount of power. For example, an SSB beam sweeping procedure may utilize multiple SSBs over multiple time periods. To help mitigate the amount of power consumed by the SSB beam sweeping procedure, the configuration 400 (e.g., a beam sweeping pattern) may be used for sweeping SSB transmissions in both time and frequency domains. For example, the configuration 400 may include three sets of SSBs separated by time gaps 420. The first set of SSBs may be associated with a first SSB pattern 425-a (e.g., a TDM and FDM SSB sweeping pattern in a first set of time periods) that includes the SSB0 405 and the SSB3 410, among other SSBs (e.g., SSB1 and SSB 2), the second set of SSBs may be associated with a second SSB pattern 425-b (e.g., a TDM SSB sweeping pattern in a second set of time periods) that includes the SSB3 415 among other SSBs (e.g., SSB0, SSB1, SSB2).

In some cases, the beam sweeping pattern may apply the different SSB patterns 425-a and 425-b (e.g., different multiplexing) to different sets of SSBs. For example, the SSB pattern 425-a in the frequency domain may be applied to a subset of SSB occasions (e.g., at even SSB occasions, where the first set is a zero SSB occasion, the second set a first SSB occasion, and the third set a second SSB occasion). The SSB0 405 and the SSB3 410 may be multiplexed in the time domain and the frequency domain such that the SSB0 405 and the SSB3 410 may overlap during a same TTI and at different frequencies. In some examples, the other SSBs of the first set of SSBs (e.g., of a same SSB occasion) may be multiplexed in the time domain such that the other SSBs may include separate TTIs. Additionally, the SSB3 415 of the second set of SSBs (e.g., an odd SSB occasion) may be multiplexed in the time domain with the other SSBs of the second set of SSBs (e.g., SSB0, SSB1, SSB2) according to the SSB pattern 425-b, different than the SSB pattern 425-a of the first set of SSBs.

In some examples, applying different SSB patterns 425 to different sets of SSBs (e.g., different SSB occasions) may include various benefits. One benefit may include mitigating an impact of SSB searching procedures on UEs 115 of lower capability (e.g., legacy UEs 115) as well as other UEs 115 during initial access. For example, a legacy UE 115 may be unable to detect the SSB3 410 during initial access due to an inability to monitor for FDM SSBs. However, the legacy UE 115 may be able to detect the SSB3 415 that is TDM with the other SSBs.

In some examples, the time and frequency domain multiplexed SSBs (e.g., the first set of SSBs including the SSB3 410) may result in a time gap 420-a and the time domain multiplexed SSBs (e.g., the second set of SSBs) may result in a time gap 420-b smaller than the time gap 420-a. For example, by moving the SSB3 410 from a separate time period (e.g., as done with the SSB3 415) to a shared time period (e.g., multiplexed in both the frequency and time domains) a first SSB periodicity 430-a including the first set of SSBs may include a larger gap in time (e.g., the time gap 420-a) compared to a second SSB periodicity 430-b (e.g., a same period of time as the first SSB periodicity 430-a) that includes the time gap 420-b. In some cases, a network entity 105 may utilize the time gap 420-a as a period of sleep time and perform a rest procedure for a portion or the duration of the time gap 420-a, thereby reducing the duration of time the network entity 105 is communicating SSBs and reducing the power consumption associated with SSB beam sweeping procedures.

Figure 5:
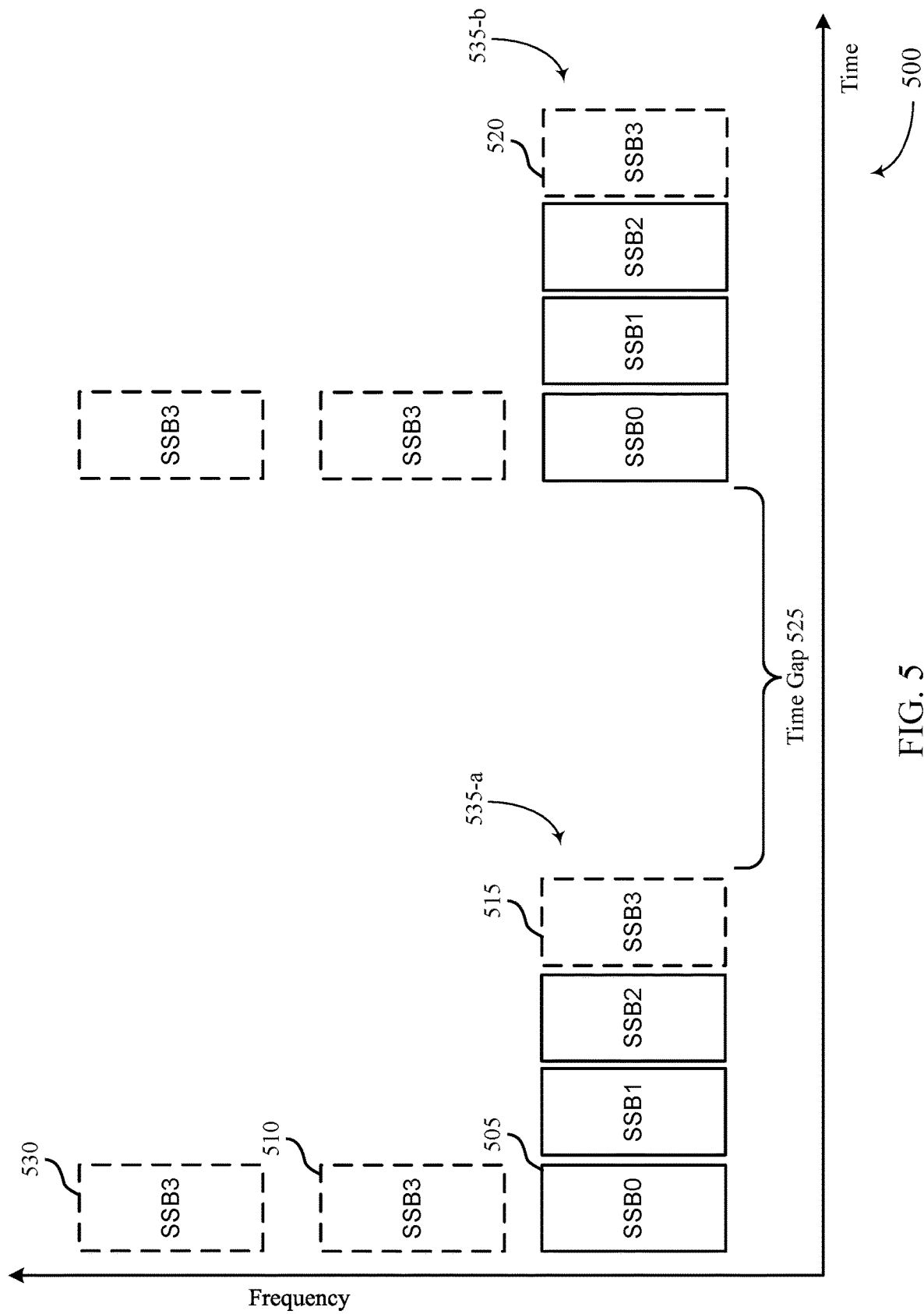
FIG. 5 illustrates an example of a configuration that supports SSB repetition in frequency domain in accordance with one or more aspects of the present disclosure.

FIG. 5 illustrates an example of a configuration 500 that supports sweeping SSB transmissions in both time and frequency domains in accordance with one or more aspects of the present disclosure. In some examples, the configuration 500 may implement or be implemented by aspects of the wireless communications systems 100 and 200 and the configurations 300 and 400, as described herein with reference to FIGS. 1-4, respectively. The configuration 500 may include an x-axis associated with time, a y-axis associated with frequency, multiple SSBs (e.g., an SSB0 505, an SSB3 510, an SSB3 515, an SSB3 520, and an SSB3 530), which may be an example of the time and frequency multiplexed SSBs 210, as described herein with reference to FIG. 2. The configuration 500 may further include a time gap 525, which may be an example of a period of time associated with a network entity rest procedure.

In some examples, the configuration 500 (e.g., a beam sweeping pattern) may help mitigate an amount of power consumed by an SSB beam sweeping procedure. For example, the configuration 500 may include two sets of SSBs of different SSB periodicity (e.g., a same SSB configuration) separated by a time gap 525, as described herein with reference to FIGS. 3 and 4.

In some cases, a network entity 105 may transmit, to a UE 115, a message indicating a muting pattern. For example, the message may be an example of control signaling 205 as described herein with reference to FIG. 2 and the sweeping pattern may include or may not include the muting pattern. The muting pattern may indicate one or more SSBs that the network entity 105 may refrain from transmitting (e.g., mute or turn off). For example, the network entity 105 may mute the SSB3 515 from a first SSB occasion by transmitting the SSB0 505 and the other SSBs (e.g., SSB1 and SSB2) but refraining from transmitting the SSB3 515.

In some examples, muting an SSB may not indicate muting all other repetitions of an SSB. For example, the SSB0 505 and the SSB3 510 may be multiplexed in the time domain and the frequency domain such that the SSB0 505 and the SSB3 510 may overlap during a same TTI and at different frequencies. In some examples, the SSB3 510 may be a repetition of the SSB3 515, and thus the network entity 105 may transmit SSB3 510 and SSB3 515 such that each have the same data and are each transmitted via the same transmission beam, but in different SSB occasions that correspond to different time and frequency resources. In some cases, the muting pattern may indicate to the UE 115 that the SSB3 515 is muted, the repetition of SSB3 510 is muted, or both. For example, the network entity 105 may indicate, in control signaling, a muting pattern where all repetitions of the SSB3 515 are muted (e.g., SSB3 510 and SSB3 530 are muted), all non-repetition SSB3s are muted (e.g., SSB3 515 and SSB3 520 are muted but repetitions of SSB3 515 (e.g., SSB3 510 and SSB3 530) are not muted), or may indicate a respective muting pattern for each repetition of an SSB (e.g., the network entity 105 may signal a first muting pattern for the SSB3 510 and a second muting pattern for the SSB3 530). In some examples, the muting patterns may vary between SSB patterns (e.g., a first SSB pattern 535-*a* may include a first muting pattern different than a second muting pattern included in a second SSB pattern 535-*b*).

In some examples, the time and frequency domain multiplexed SSBs (e.g., SSB3 510) may result in the time gap 525. For example, by moving the SSB3 510 from a separate time period (e.g., as done with the SSB3 520) to a shared time period (e.g., multiplexed in both the frequency and time domains) the time gap 525 (e.g., an increased time gap) between different periods of SSB transmissions may result. In some cases, a network entity 105 may utilize the time gap 525 as a period of sleep time and perform a rest procedure for the duration of the time gap 525, thereby reducing the duration of time the network entity 105 is communicating SSBs and reducing the power consumption associated with SSB beam sweeping procedures.

Figure 6:
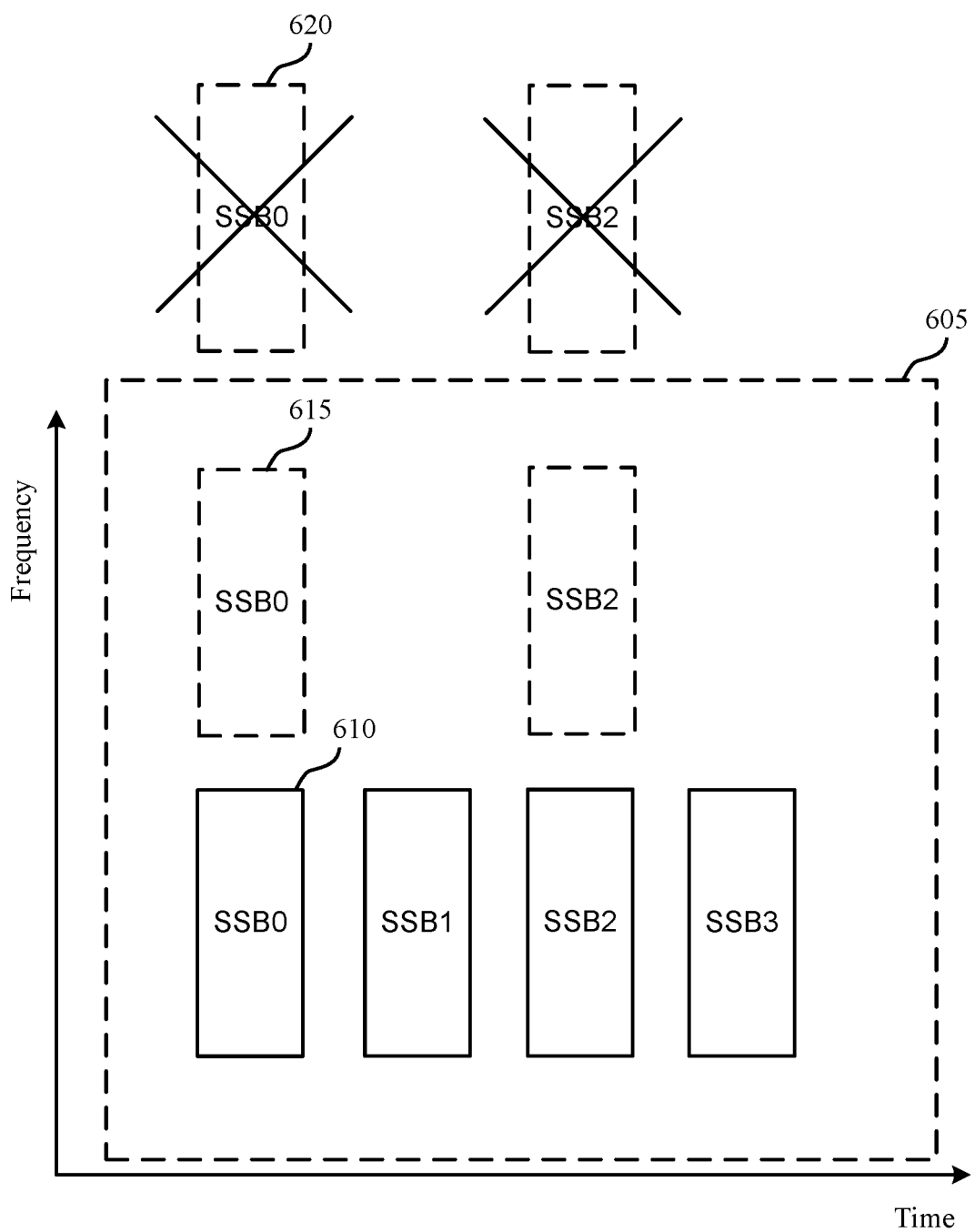
FIG. 6 illustrates an example of a configuration that supports SSB repetition in frequency domain in accordance with one or more aspects of the present disclosure.

FIG. 6 illustrates an example of a configuration 600 that supports sweeping SSB transmissions in both time and frequency domains in accordance with one or more aspects of the present disclosure. In some examples, the configuration 600 may implement or be implemented by aspects of the wireless communications systems 100 and 200 and the configurations 300, 400, and 500, as described herein with reference to FIGS. 1-5, respectively. The configuration 600 may include an x-axis associated with time, a y-axis associated with frequency, an active BWP 605 and multiple SSBs (e.g., an SSB0 610, an SSB0 615, and an SSB0 620), which may be an example of the time and frequency multiplexed SSBs 210, as described herein with reference to FIG. 2.

In some examples, the configuration 600 (e.g., a beam sweeping pattern) may help mitigate an amount of power consumed by an SSB beam sweeping procedure. For example, the configuration 600 may include a set of SSBs including the SSB0 610, the SSB0 615, and the SSB0 620, which may be examples of SSB repetition, among other SSBs (e.g., SSB1, SSB2s, and SSB3). The SSB0 610, the SSB0 615, and the SSB0 620 may be multiplexed in the time domain and the frequency domain.

In some examples, a network entity 105 may transmit, to a UE 115, a message indicating which one or more BWPs of a set of multiple BWPs is active (e.g., BWP 605 is the active BWP) for monitoring the set of SSBs. In some cases, due to the FDM SSBs (e.g., the repetition in frequency domain), some of the configured repetitions (e.g., SSB0 620) may fall outside of the active BWP 605. In these cases, the UE 115 may be configured to measure the SSBs, SSB repetitions, or both, that fall within the BWP 605 (e.g., an active downlink BWP), and may refrain from measuring any SSBs, SSB repetitions, or both, that occur outside of the active BWP 605. For example, the network entity 105 may transmit SSBs, SSB repetitions, or both, some of which are transmitted (e.g., SSB0 620) outside of the BWP 605. The UE 115 may monitor for the SSB0 610 and the SSB0 615 within the BWP 605 and refrain from monitoring for the SSB0 620.

Figure 7:
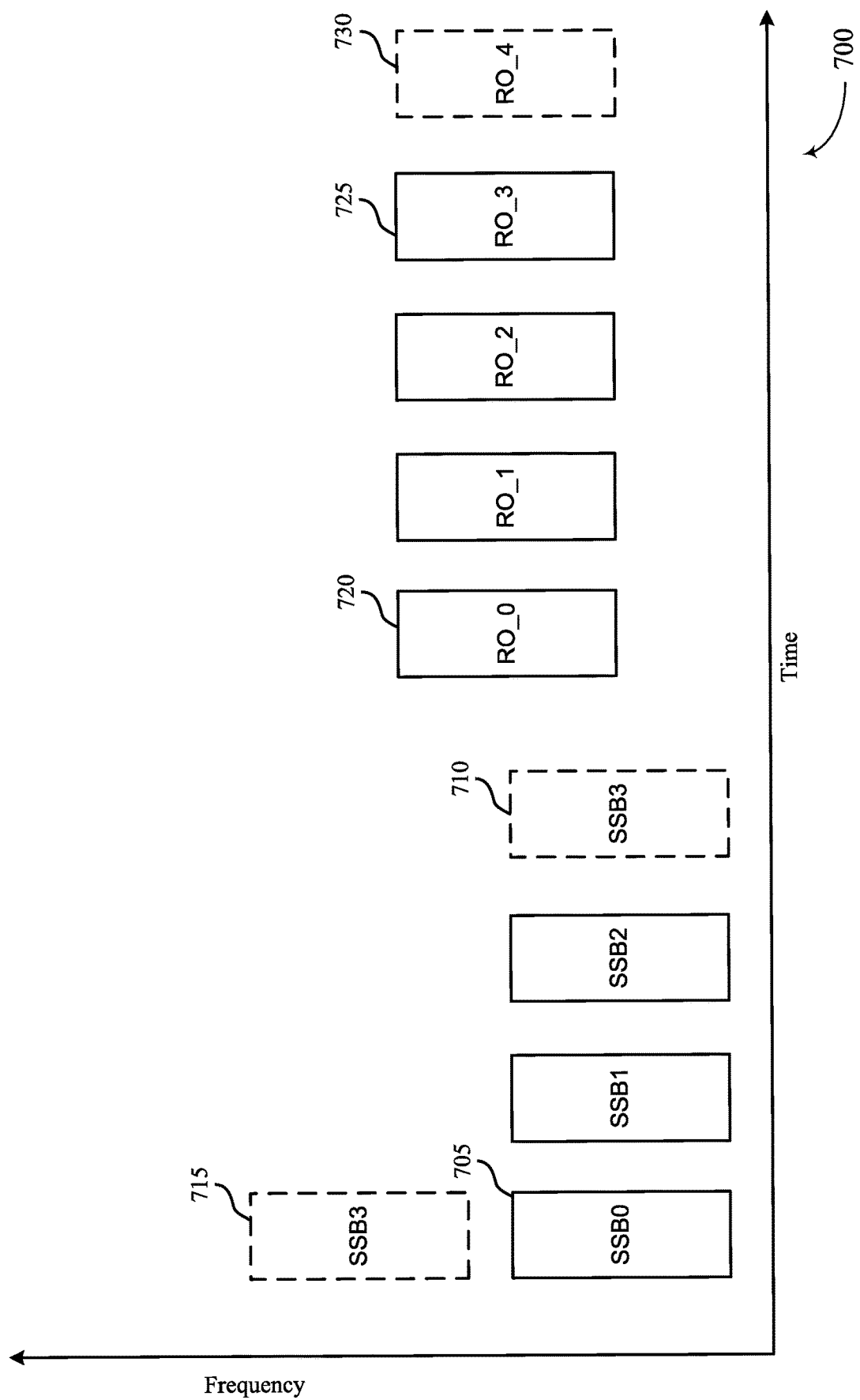
FIG. 7 illustrates an example of a configuration that supports SSB repetition in frequency domain in accordance with one or more aspects of the present disclosure.

FIG. 7 illustrates an example of a configuration 700 that supports sweeping SSB transmissions in both time and frequency domains in accordance with one or more aspects of the present disclosure. In some examples, the configuration 700 may implement or be implemented by aspects of the wireless communications systems 100 and 200 and the configurations 300, 400, 500, and 600, as described herein with reference to FIGS. 1-6, respectively. The configuration 700 may include an x-axis associated with time, a y-axis associated with frequency, multiple SSBs associated with multiple ROs (e.g., an SSB0 705 associated with an RO_0 720, an SSB3 710 associated with an RO_3 725, and an SSB3 715 optionally associated with the RO_3 725 or the RO_4 730), which may be an example of the time and frequency multiplexed SSBs 210, as described herein with reference to FIG. 2.

In some examples, the configuration 700 may help mitigate an amount of power consumed by an SSB beam sweeping procedure. For example, the configuration 700 may include a set of SSBs including the SSB0 705, the SSB3 710, and the SSB3 715, among other SSBs (e.g., the SSB1 and the SSB2). In some cases, the SSB0 705 and the SSB3 715 (e.g., a repetition of SSB3 710) may be multiplexed in the time domain and the frequency domain.

In some cases, a network entity 105 may transmit, to a UE 115, control signaling indicating a beam sweeping pattern based on a random access procedure. For example, the UE 115 or the network entity 105 may detect a beam failure. To facilitate further communications, the UE 115 may monitor and measure each SSB according to the beam sweeping pattern, determine an RO associated with a desired beam (e.g., a best beam), and transmit an indication of a preferred beam. For example, the UE 115 may measure the SSB0 705 and the SSB3 715 transmitted with a first beam and the SSB3 710 (e.g., and each intervening SSB) transmitted with a second beam, determine that the SSB0 705 has a desired beam (e.g., a strongest signal), and choose that beam by transmitting a message (e.g., a random access message) in the corresponding RO_0 720. In some cases, the RO_3 725 may be associated with both the SSB3 710 and the SSB3 715 (e.g., both the SSB and the repetition SSB are associated with a same RO). In some examples, the RO_3 725 may be associated with the SSB3 710 and the RO_4 730 may be associated with the SSB3 715 (e.g., the SSB and the repetition SSB are associated with different ROs). To differentiate a beam associated with repeated SSBs, in some examples, the repetitions for an SSB may be associated with different ROs. For example, the UE 115 may determine that the RO_4 associated with the SSB3 715 is associated with a desired beam, and may transmit, to the network entity 105, a random access message during the RO_4 to indicate the desired beam. In some examples, the repetitions for an SSB may be associated with same ROs, such that the UE 115 may transmit a random access message during the RO_3 that is associated with the SSB3 710 and the SSB3 715.

By having two ROs associated with SSB3 710 and its repetition SSB3 715, the UE 115 may also provide indicate which frequency band provides better performance as SSB3 710 and its repetition SSB3 715 are offset from one another in frequency, even though the same beam is being used by network entity 105 to transmit in SSB3 710 and its repetition SSB3 715. For example, if a channel metric observed by UE 115 when measuring repetition SSB3 715 is better than a channel metric observed when measuring SSB3 710, the UE 115 may transmit a random access message in RO_4 to indicate repetition SSB3 715 and its corresponding frequency band provide better performance than SSB3 710.

Figure 8:
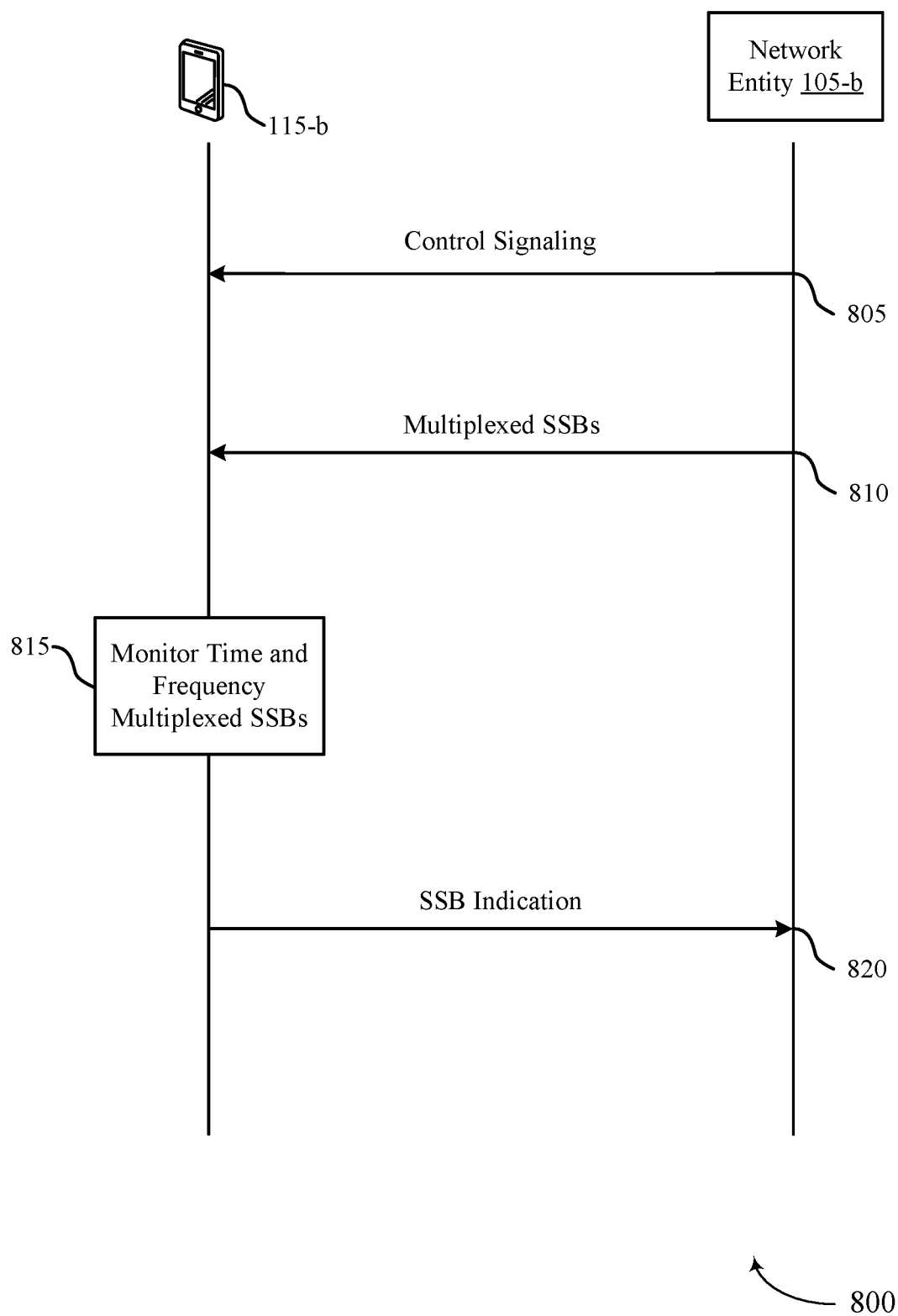
FIG. 8 illustrates an example of a process flow that supports SSB repetition in frequency domain in accordance with one or more aspects of the present disclosure.

FIG. 8 illustrates an example of a process flow 800 that supports sweeping SSB transmissions in both time and frequency domains in accordance with one or more aspects of the present disclosure. In some examples, the process flow 800 may implement or be implemented by aspects of the wireless communications systems 100 and 200 and the configurations 300, 400, 500, 600, and 700, as described herein with reference to FIGS. 1-7, respectively. For example, the process flow 800 may be implemented by a network entity 105-*b* and a UE 115-*b*, which may be respective examples of network entities 105 and UEs 115 as described with reference to FIGS. 1 and 2. In the following description of the process flow 800, the operations between the network entity 105-*b* and the UE 115-*b* may be transmitted in a different order than the example order shown, or the operations performed by the network entity 105-*b* and the UE 115-*b* may be performed in different orders or at different times. Some operations may also be omitted from the process flow 800, and other operations may be added to the process flow 800.

At 805, the network entity 105-*b* may transmit, to the UE 115-*b*, control signaling that indicates a sweeping pattern for multiple SSBs (e.g., a set of SSBs) that are multiplexed across a time domain and a frequency domain, and that indicates a first set of time periods over which the sweeping pattern repeats. In some examples, the control signaling may further indicate a number of SSB repetitions, a periodicity of SSB repetitions, a muting pattern, or any combination thereof. For example, the control signaling may be communicated on a first cell (e.g., a PCell) and provide configuration information associated with a second cell (e.g., an SCell) different from the first cell of the network entity 105-*b*. In some examples, the control signaling or another message may indicate an active BWP for monitoring the SSBs indicated in the sweeping pattern.

In some cases, the sweeping pattern may include indications of various SSB patterns. For example, the sweeping pattern may indicate a first set of SSBs that are multiplexed across the time domain and the frequency domain in the first set of time periods and a second set of SSBs that are multiplexed across the time domain in a second set of time periods, as described with reference to FIG. 4. In some cases, the network entity 105-*b* may perform a rest procedure between the first set of time periods and the second set of time periods, as described herein with reference to FIGS. 2-5. The sweeping pattern may indicate a first SSB multiplexed across the time domain and the frequency domain is repeated during the first set of time periods, as described with reference to FIG. 5.

In some examples, the sweeping pattern may include a muting pattern or the control signaling may include the muting pattern. The muting pattern may indicate to mute a first SSB of the set of SSBs and each repetition of the first SSB, a first SSB of the set of SSBs (e.g., monitoring for each repetition of the first SSB), or may include an indication of a respective muting pattern for each repetition of an SSB of the set of SSBs, as described herein with reference to FIG. 6.

At 810, the network entity 105-*b* may transmit, to the UE 115-*b*, multiplexed SSBs in accordance with the sweeping pattern. In some cases, the network entity 105-*b* may transmit time and frequency multiplexed SSBs within and outside of the active BWP for monitoring the SSBs indicated in the sweeping pattern. At 815, the UE 115-*b* may monitor, during a first time period of the first set of time periods, two or more SSBs multiplexed across the time domain and the frequency domain based on the sweeping pattern. In some cases, the UE 115-*b* may determine a desired beam (e.g., a best beam) and may transmit, to the network entity 105-*b*, a random access message during one of a first RO associated with a first SSB of the two or more SSBs or a second RO associated with a repetition of the first SSB, or during a third RO that is associated with each of the first SSB and the repetition of the first SSB, as described herein with reference to FIG. 7.

At 820, the UE 115-*b* may transmit, to the network entity 105-*b*, a message indicating an SSB. For example, the message may be the random access message indicating a desired beam.

Figure 9:
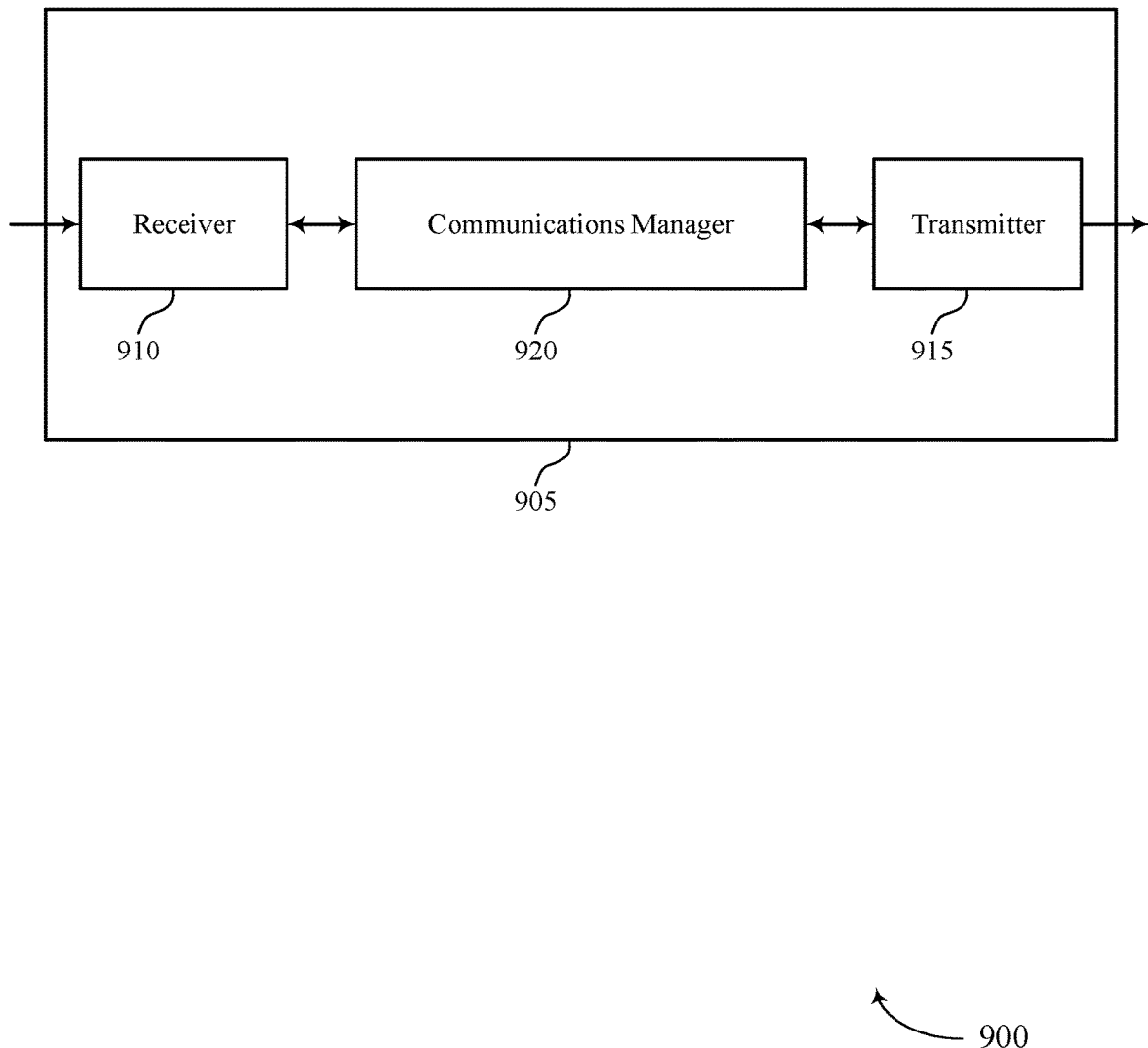
FIGS. 9 and 10 show block diagrams of devices that support SSB repetition in frequency domain in accordance with one or more aspects of the present disclosure.

FIG. 9 shows a block diagram 900 of a device 905 that supports SSB repetition in frequency domain in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to SSB repetition in frequency domain). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to SSB repetition in frequency domain). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of SSB repetition in frequency domain as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for receiving, from a network entity, control signaling that indicates a sweeping pattern for a set of multiple SSBs that are multiplexed across a time domain and a frequency domain, and that indicates a first set of multiple time periods over which the sweeping pattern repeats. The communications manager 920 may be configured as or otherwise support a means for monitoring, during a first time period of the first set of multiple time periods, two or more SSBs multiplexed across the time domain and the frequency domain in accordance with the sweeping pattern. The communications manager 920 may be configured as or otherwise support a means for transmitting, to the network entity, an indication of a SSB of the set of multiple SSBs based on the monitoring.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced power consumption.

Figure 10:
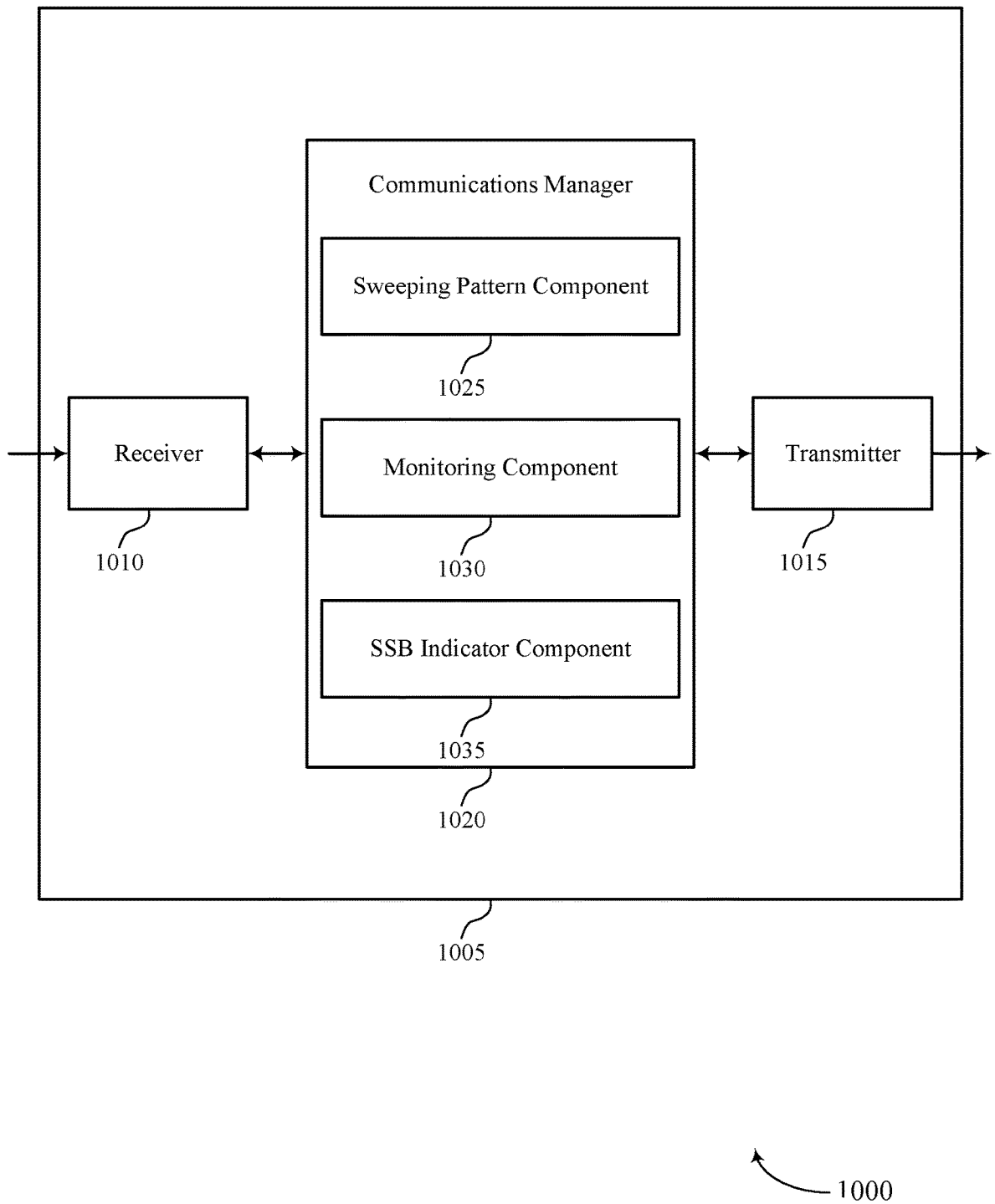

FIG. 10 shows a block diagram 1000 of a device 1005 that supports SSB repetition in frequency domain in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to SSB repetition in frequency domain). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to SSB repetition in frequency domain). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of SSB repetition in frequency domain as described herein. For example, the communications manager 1020 may include a sweeping pattern component 1025, a monitoring component 1030, an SSB indicator component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The sweeping pattern component 1025 may be configured as or otherwise support a means for receiving, from a network entity, control signaling that indicates a sweeping pattern for a set of multiple SSBs that are multiplexed across a time domain and a frequency domain, and that indicates a first set of multiple time periods over which the sweeping pattern repeats. The monitoring component 1030 may be configured as or otherwise support a means for monitoring, during a first time period of the first set of multiple time periods, two or more SSBs multiplexed across the time domain and the frequency domain in accordance with the sweeping pattern. The SSB indicator component 1035 may be configured as or otherwise support a means for transmitting, to the network entity, an indication of a SSB of the set of multiple SSBs based on the monitoring.

Figure 11:
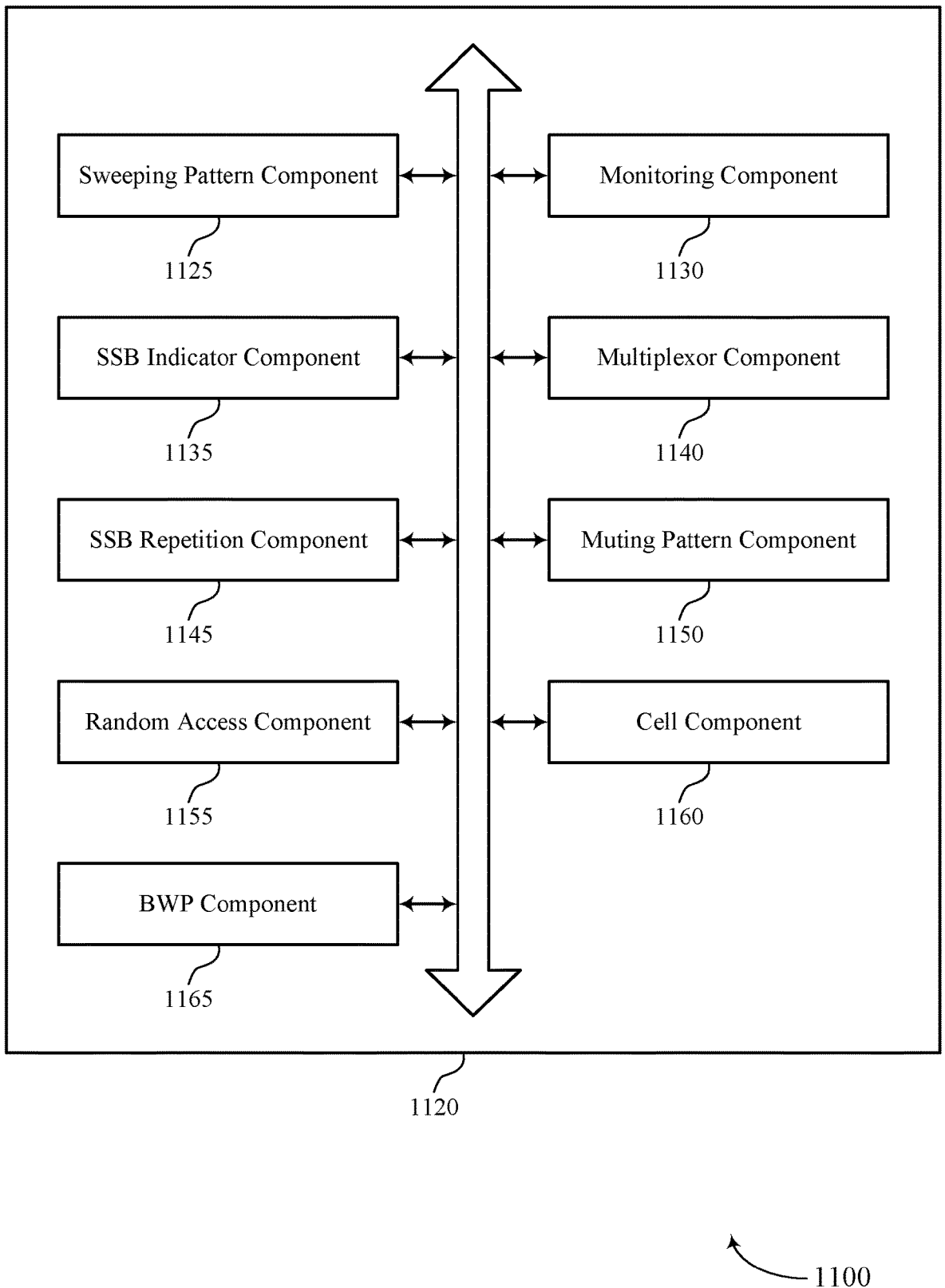
FIG. 11 shows a block diagram of a communications manager that supports SSB repetition in frequency domain in accordance with one or more aspects of the present disclosure.

FIG. 11 shows a block diagram 1100 of a communications manager 1120 that supports SSB repetition in frequency domain in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of SSB repetition in frequency domain as described herein. For example, the communications manager 1120 may include a sweeping pattern component 1125, a monitoring component 1130, an SSB indicator component 1135, a multiplexor component 1140, an SSB repetition component 1145, a muting pattern component 1150, a random access component 1155, a cell component 1160, a BWP component 1165, or any combination thereof. Each of these components may communicate, directly or indirectly, with one another (e.g., via one or more buses).

The communications manager 1120 may support wireless communication at a UE in accordance with examples as disclosed herein. The sweeping pattern component 1125 may be configured as or otherwise support a means for receiving, from a network entity, control signaling that indicates a sweeping pattern for a set of multiple SSBs that are multiplexed across a time domain and a frequency domain, and that indicates a first set of multiple time periods over which the sweeping pattern repeats. The monitoring component 1130 may be configured as or otherwise support a means for monitoring, during a first time period of the first set of multiple time periods, two or more SSBs multiplexed across the time domain and the frequency domain in accordance with the sweeping pattern. The SSB indicator component 1135 may be configured as or otherwise support a means for transmitting, to the network entity, an indication of a SSB of the set of multiple SSBs based on the monitoring.

In some examples, to support receiving the control signaling, the multiplexor component 1140 may be configured as or otherwise support a means for receiving an indication of a first set of SSBs of the set of multiple SSBs that are multiplexed across the time domain and the frequency domain in the first set of multiple time periods and a second set of SSBs of the set of multiple SSBs are multiplexed across the time domain in a second set of multiple time periods.

In some examples, to support receiving the control signaling, the SSB repetition component 1145 may be configured as or otherwise support a means for receiving an indication that a first SSB of the two or more SSBs is repeated during the first time period of the first set of multiple time periods.

In some examples, to support receiving the control signaling, the muting pattern component 1150 may be configured as or otherwise support a means for receiving an indication of a muting pattern that indicates to mute a first SSB of the set of multiple SSBs and to mute each repetition of the first SSB.

In some examples, to support receiving the control signaling, the muting pattern component 1150 may be configured as or otherwise support a means for receiving an indication of a muting pattern that indicates to mute a first SSB of the set of multiple SSBs and to monitor for each repetition of the first SSB.

In some examples, to support receiving the control signaling, the muting pattern component 1150 may be configured as or otherwise support a means for receiving an indication of a muting pattern for a repetition of a first SSB of the set of multiple SSBs.

In some examples, the random access component 1155 may be configured as or otherwise support a means for transmitting a random access message during one of a first RO associated with a first SSB of the two or more SSBs or a second RO associated with a repetition of the first SSB.

In some examples, the random access component 1155 may be configured as or otherwise support a means for transmitting a random access message during a RO that is associated with each of a first SSB of the two or more SSBs and a repetition of the first SSB.

In some examples, to support receiving the control signaling, the cell component 1160 may be configured as or otherwise support a means for receiving, from the network entity of a first cell, the control signaling associated with a second network entity of a second cell, where the control signaling indicates a number of SSB repetitions, a periodicity of SSB repetitions, a muting pattern, or any combination thereof.

In some examples, the BWP component 1165 may be configured as or otherwise support a means for receiving, from the network entity, a message indicating a bandwidth part for monitoring the two or more SSBs. In some examples, the monitoring component 1130 may be configured as or otherwise support a means for monitoring a subset of the two or more SSBs that occur within the bandwidth part.

Figure 12:
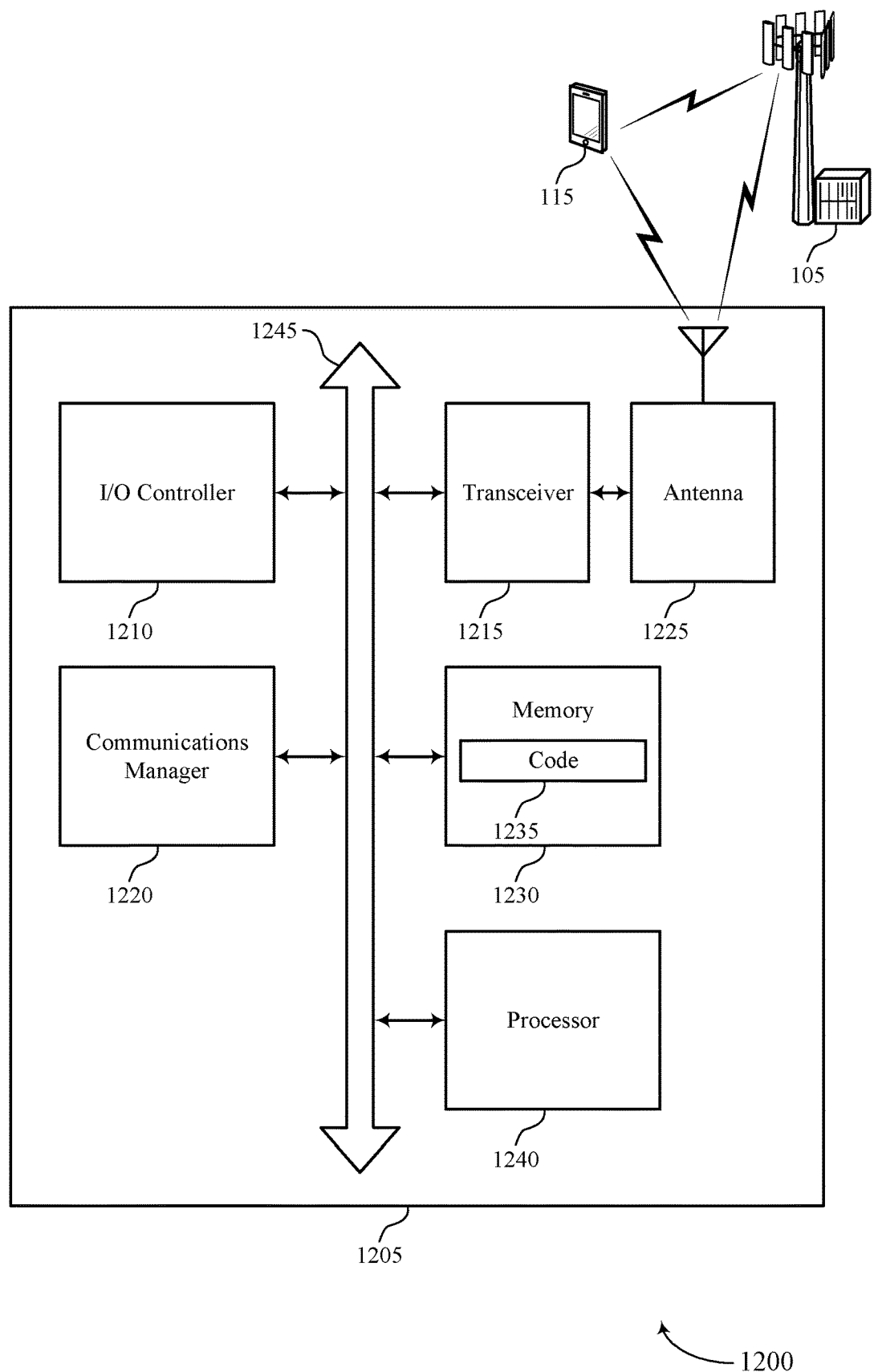
FIG. 12 shows a diagram of a system including a device that supports SSB repetition in frequency domain in accordance with one or more aspects of the present disclosure.

FIG. 12 shows a diagram of a system 1200 including a device 1205 that supports SSB repetition in frequency domain in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting SSB repetition in frequency domain). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving, from a network entity, control signaling that indicates a sweeping pattern for a set of multiple SSBs that are multiplexed across a time domain and a frequency domain, and that indicates a first set of multiple time periods over which the sweeping pattern repeats. The communications manager 1220 may be configured as or otherwise support a means for monitoring, during a first time period of the first set of multiple time periods, two or more SSBs multiplexed across the time domain and the frequency domain in accordance with the sweeping pattern. The communications manager 1220 may be configured as or otherwise support a means for transmitting, to the network entity, an indication of a SSB of the set of multiple SSBs based on the monitoring.

By including or configuring the communications manager 1220 in accordance with examples as described herein, the device 1205 may support techniques for reduced power consumption.

In some examples, the communications manager 1220 may be configured to perform various operations (e.g., receiving, monitoring, transmitting) using or otherwise in cooperation with the transceiver 1215, the one or more antennas 1225, or any combination thereof. For example, the communications manager 1220 may be configured to receive or transmit messages or other signaling as described herein via the transceiver 1215. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of SSB repetition in frequency domain as described herein, or the processor 1240 and the memory 1230 may be otherwise configured to perform or support such operations.

Figure 13:
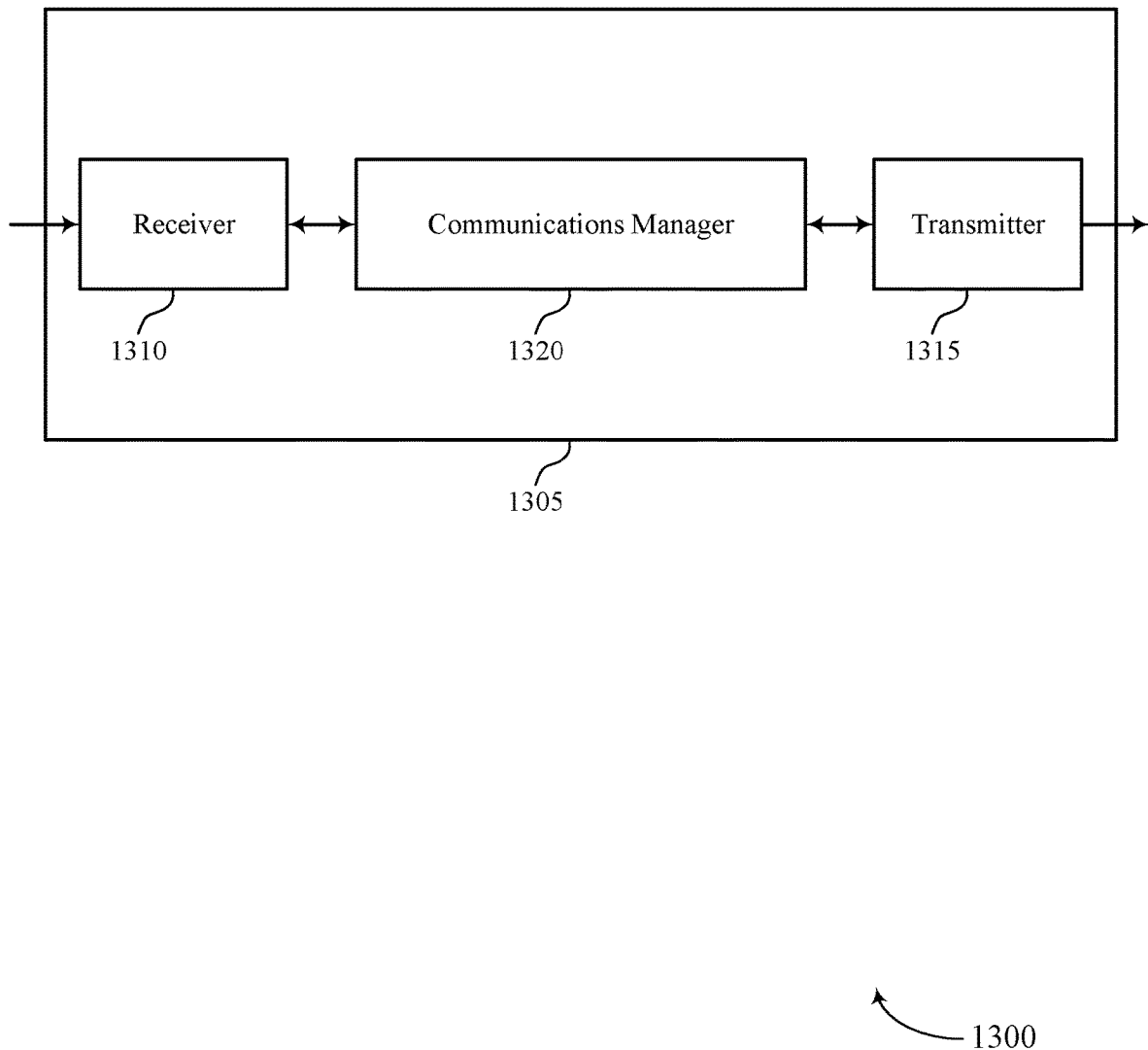
FIGS. 13 and 14 show block diagrams of devices that support SSB repetition in frequency domain in accordance with one or more aspects of the present disclosure.

FIG. 13 shows a block diagram 1300 of a device 1305 that supports SSB repetition in frequency domain in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of SSB repetition in frequency domain as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. For example, the communications manager 1320 may be configured as or otherwise support a means for transmitting, to a UE, control signaling that indicates a sweeping pattern for a set of multiple SSBs that are multiplexed across a time domain and a frequency domain, and that indicates a first set of multiple time periods over which the sweeping pattern repeats. The communications manager 1320 may be configured as or otherwise support a means for transmitting, to the UE during a first time period of the first set of multiple time periods, two or more SSBs multiplexed across the time domain and the frequency domain based on the sweeping pattern. The communications manager 1320 may be configured as or otherwise support a means for receiving, from the UE, an indication of a SSB of the set of multiple SSBs based on the two or more SSBs.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for reduced power consumption.

Figure 14:
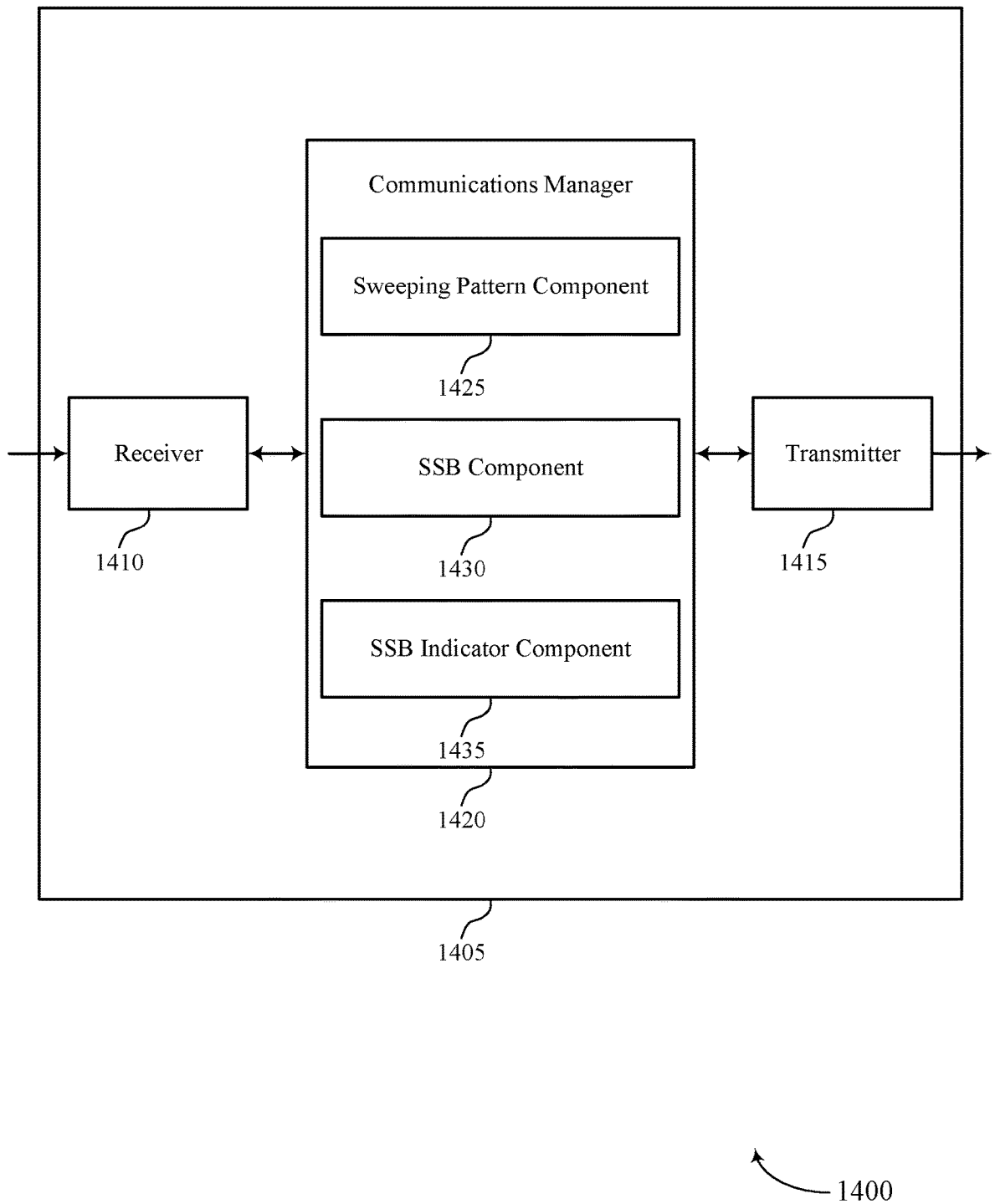

FIG. 14 shows a block diagram 1400 of a device 1405 that supports SSB repetition in frequency domain in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of SSB repetition in frequency domain as described herein. For example, the communications manager 1420 may include a sweeping pattern component 1425, an SSB component 1430, an SSB indicator component 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a network entity in accordance with examples as disclosed herein. The sweeping pattern component 1425 may be configured as or otherwise support a means for transmitting, to a UE, control signaling that indicates a sweeping pattern for a set of multiple SSBs that are multiplexed across a time domain and a frequency domain, and that indicates a first set of multiple time periods over which the sweeping pattern repeats. The SSB component 1430 may be configured as or otherwise support a means for transmitting, to the UE during a first time period of the first set of multiple time periods, two or more SSBs multiplexed across the time domain and the frequency domain based on the sweeping pattern. The SSB indicator component 1435 may be configured as or otherwise support a means for receiving, from the UE, an indication of a SSB of the set of multiple SSBs based on the two or more SSBs.

Figure 15:
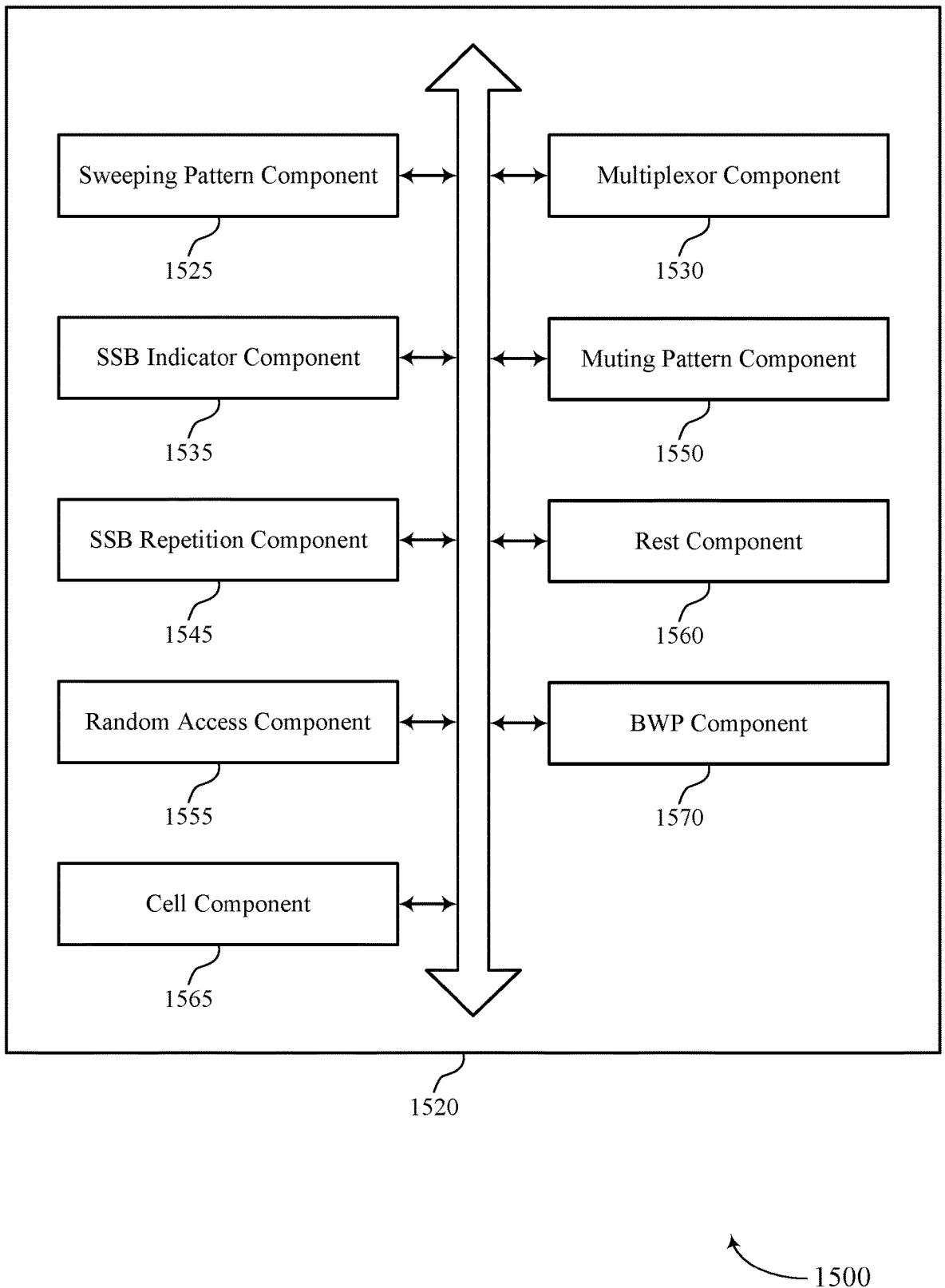
FIG. 15 shows a block diagram of a communications manager that supports SSB repetition in frequency domain in accordance with one or more aspects of the present disclosure.

FIG. 15 shows a block diagram 1500 of a communications manager 1520 that supports SSB repetition in frequency domain in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of SSB repetition in frequency domain as described herein. For example, the communications manager 1520 may include a sweeping pattern component 1525, a multiplexor component 1530, an SSB indicator component 1535, an SSB repetition component 1545, a muting pattern component 1550, a random access component 1555, a rest component 1560, a cell component 1565, a BWP component 1570, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communication at a network entity in accordance with examples as disclosed herein. The sweeping pattern component 1525 may be configured as or otherwise support a means for transmitting, to a UE, control signaling that indicates a sweeping pattern for a set of multiple SSBs that are multiplexed across a time domain and a frequency domain, and that indicates a first set of multiple time periods over which the sweeping pattern repeats. The multiplexor component 1530 may be configured as or otherwise support a means for transmitting, to the UE during a first time period of the first set of multiple time periods, two or more SSBs multiplexed across the time domain and the frequency domain based on the sweeping pattern. The SSB indicator component 1535 may be configured as or otherwise support a means for receiving, from the UE, an indication of a SSB of the set of multiple SSBs based on the two or more SSBs.

In some examples, to support transmitting the control signaling, the multiplexor component 1530 may be configured as or otherwise support a means for transmitting an indication of a first set of SSBs of the set of multiple SSBs that are multiplexed across the time domain and the frequency domain in the first set of multiple time periods and a second set of SSBs of the set of multiple SSBs are multiplexed across the time domain in a second set of multiple time periods.

In some examples, to support transmitting the control signaling, the SSB repetition component 1545 may be configured as or otherwise support a means for transmitting an indication that a first SSB of the two or more SSBs is repeated during the first time period of the first set of multiple time periods.

In some examples, to support transmitting the control signaling, the muting pattern component 1550 may be configured as or otherwise support a means for transmitting an indication of a muting pattern that indicates to mute a first SSB of the set of multiple SSBs and to mute each repetition of the first SSB.

In some examples, to support transmitting the control signaling, the muting pattern component 1550 may be configured as or otherwise support a means for transmitting an indication of a muting pattern that indicates to mute a first SSB of the set of multiple SSBs and to monitor for each repetition of the first SSB.

In some examples, to support transmitting the control signaling, the muting pattern component 1550 may be configured as or otherwise support a means for transmitting an indication of a muting pattern for a repetition of a first SSB of the set of multiple SSBs.

In some examples, the random access component 1555 may be configured as or otherwise support a means for receiving a random access message during one of a first RO associated with a first SSB of the two or more SSBs or a second RO associated with a repetition of the first SSB.

In some examples, the random access component 1555 may be configured as or otherwise support a means for receiving a random access message during a RO that is associated with each of a first SSB of the two or more SSBs and a repetition of the first SSB.

In some examples, the rest component 1560 may be configured as or otherwise support a means for performing a rest procedure for a set of time periods preceded by the first time period based on the two or more SSBs.

In some examples, to support transmitting the control signaling, the cell component 1565 may be configured as or otherwise support a means for transmitting, from the network entity of a first cell, the control signaling associated with a second network entity of a second cell, where the control signaling indicates a number of SSB repetitions, a periodicity of SSB repetitions, a muting pattern, or any combination thereof.

In some examples, the BWP component 1570 may be configured as or otherwise support a means for transmitting, to the UE, a message indicating a bandwidth part for monitoring the two or more SSBs, where a subset of the two or more SSBs occur within the bandwidth part.

Figure 16:
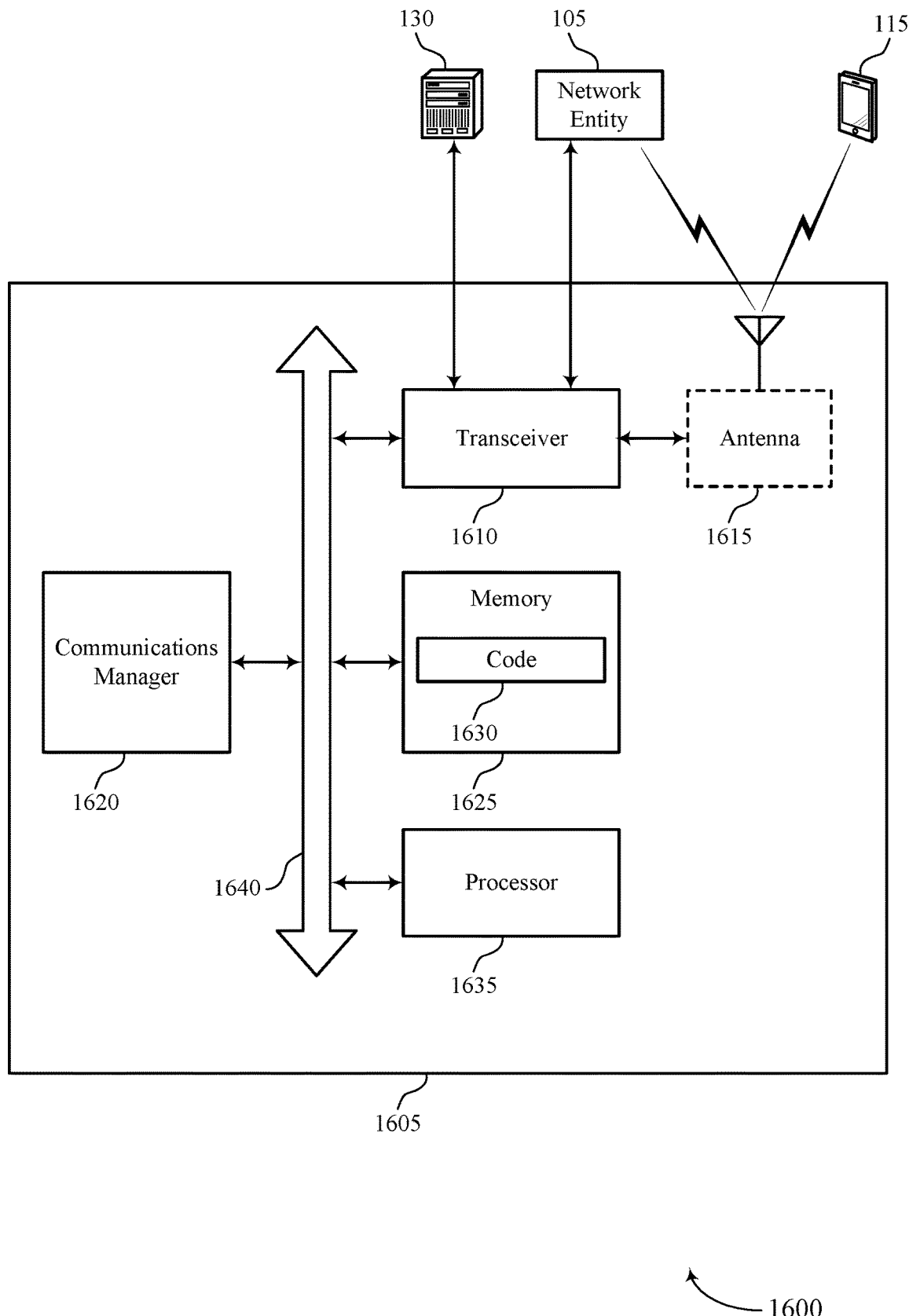
FIG. 16 shows a diagram of a system including a device that supports SSB repetition in frequency domain in accordance with one or more aspects of the present disclosure.

FIG. 16 shows a diagram of a system 1600 including a device 1605 that supports SSB repetition in frequency domain in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. The transceiver 1610, or the transceiver 1610 and one or more antennas 1615 or wired interfaces, where applicable, may be an example of a transmitter 1315, a transmitter 1415, a receiver 1310, a receiver 1410, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting SSB repetition in frequency domain). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communication at a network entity in accordance with examples as disclosed herein. For example, the communications manager 1620 may be configured as or otherwise support a means for transmitting, to a UE, control signaling that indicates a sweeping pattern for a set of multiple SSBs that are multiplexed across a time domain and a frequency domain, and that indicates a first set of multiple time periods over which the sweeping pattern repeats. The communications manager 1620 may be configured as or otherwise support a means for transmitting, to the UE during a first time period of the first set of multiple time periods, two or more SSBs multiplexed across the time domain and the frequency domain based on the sweeping pattern. The communications manager 1620 may be configured as or otherwise support a means for receiving, from the UE, an indication of a SSB of the set of multiple SSBs based on the two or more SSBs.

By including or configuring the communications manager 1620 in accordance with examples as described herein, the device 1605 may support techniques for reduced power consumption.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. For example, the communications manager 1620 may be configured to receive or transmit messages or other signaling as described herein via the transceiver 1610. Although the communications manager 1620 is illustrated as a separate component, in some examples, one or more functions described with reference to the communications manager 1620 may be supported by or performed by the processor 1635, the memory 1625, the code 1630, the transceiver 1610, or any combination thereof. For example, the code 1630 may include instructions executable by the processor 1635 to cause the device 1605 to perform various aspects of SSB repetition in frequency domain as described herein, or the processor 1635 and the memory 1625 may be otherwise configured to perform or support such operations.

Figure 17:
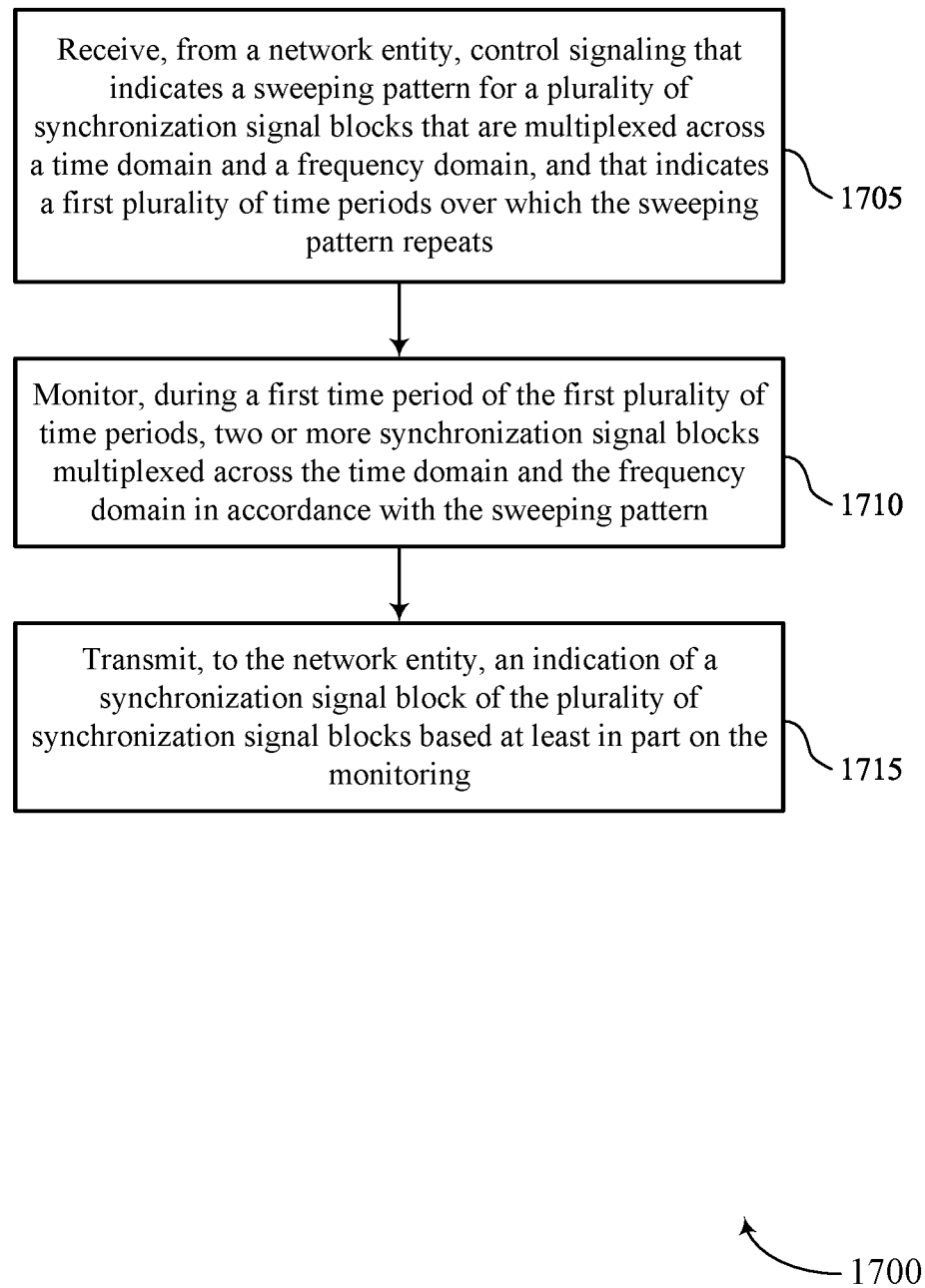
FIGS. 17 through 20 show flowcharts illustrating methods that support SSB repetition in frequency domain in accordance with one or more aspects of the present disclosure.

FIG. 17 shows a flowchart illustrating a method 1700 that supports SSB repetition in frequency domain in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving, from a network entity, control signaling that indicates a sweeping pattern for a set of multiple SSBs that are multiplexed across a time domain and a frequency domain, and that indicates a first set of multiple time periods over which the sweeping pattern repeats. The operations of 1705 may be performed in accordance with examples as disclosed herein. In some examples, aspects of the operations of 1705 may be performed by a sweeping pattern component 1125 as described with reference to FIG. 11. Additionally, or alternatively, means for performing 1705 may, but not necessarily, include, for example, communications manager 1220, I/O controller 1210, transceiver 1215, antenna 1225, memory 1230, code 1235, and processor 1240.

At 1710, the method may include monitoring, during a first time period of the first set of multiple time periods, two or more SSBs multiplexed across the time domain and the frequency domain in accordance with the sweeping pattern. The operations of 1710 may be performed in accordance with examples as disclosed herein. In some examples, aspects of the operations of 1710 may be performed by a monitoring component 1130 as described with reference to FIG. 11. Additionally, or alternatively, means for performing 1710 may, but not necessarily, include, for example, communications manager 1220, I/O controller 1210, transceiver 1215, antenna 1225, memory 1230, code 1235, and processor 1240.

At 1715, the method may include transmitting, to the network entity, an indication of a SSB of the set of multiple SSBs based on the monitoring. The operations of 1715 may be performed in accordance with examples as disclosed herein. In some examples, aspects of the operations of 1715 may be performed by an SSB indicator component 1135 as described with reference to FIG. 11. Additionally, or alternatively, means for performing 1715 may, but not necessarily, include, for example, communications manager 1220, I/O controller 1210, transceiver 1215, antenna 1225, memory 1230, code 1235, and processor 1240.

Figure 18:
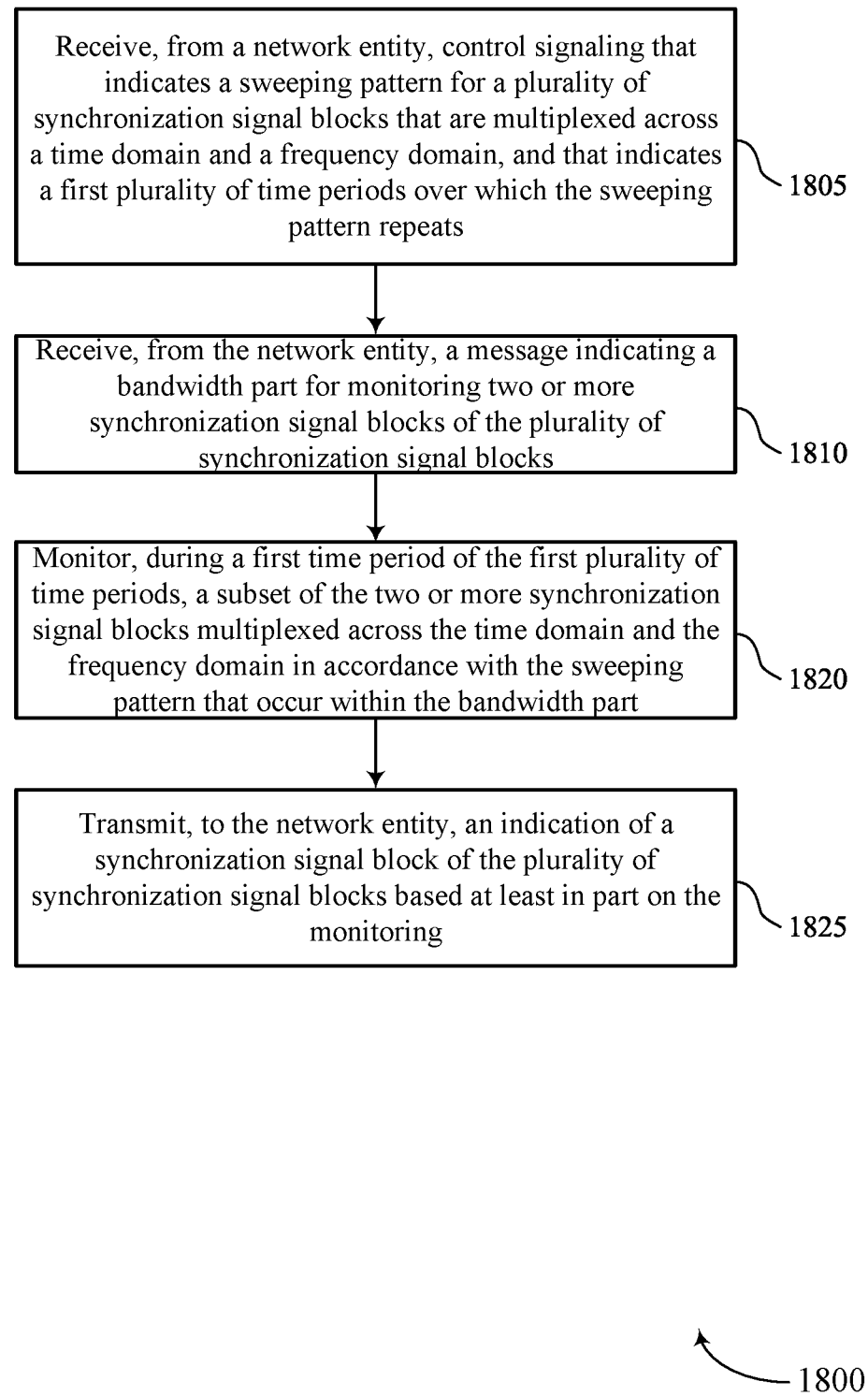

FIG. 18 shows a flowchart illustrating a method 1800 that supports SSB repetition in frequency domain in accordance with one or more aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving, from a network entity, control signaling that indicates a sweeping pattern for a set of multiple SSBs that are multiplexed across a time domain and a frequency domain, and that indicates a first set of multiple time periods over which the sweeping pattern repeats. The operations of 1805 may be performed in accordance with examples as disclosed herein. In some examples, aspects of the operations of 1805 may be performed by a sweeping pattern component 1125 as described with reference to FIG. 11. Additionally, or alternatively, means for performing 1805 may, but not necessarily, include, for example, communications manager 1220, I/O controller 1210, transceiver 1215, antenna 1225, memory 1230, code 1235, and processor 1240.

At 1810, the method may include receiving, from the network entity, a message indicating a bandwidth part for monitoring two or more SSBs of the plurality of SSBs. The operations of 1810 may be performed in accordance with examples as disclosed herein. In some examples, aspects of the operations of 1810 may be performed by a BWP component 1165 as described with reference to FIG. 11. Additionally, or alternatively, means for performing 1810 may, but not necessarily, include, for example, communications manager 1220, I/O controller 1210, transceiver 1215, antenna 1225, memory 1230, code 1235, and processor 1240.

At 1820, the method may include monitoring, during a first time period of the first set of multiple time periods, a subset of the two or more SSBs multiplexed across the time domain and the frequency domain in accordance with the sweeping pattern that occur within the bandwidth part. The operations of 1820 may be performed in accordance with examples as disclosed herein. In some examples, aspects of the operations of 1820 may be performed by a monitoring component 1130 as described with reference to FIG. 11. Additionally, or alternatively, means for performing 1820 may, but not necessarily, include, for example, communications manager 1220, I/O controller 1210, transceiver 1215, antenna 1225, memory 1230, code 1235, and processor 1240.

At 1825, the method may include transmitting, to the network entity, an indication of a SSB of the set of multiple SSBs based on the monitoring. The operations of 1825 may be performed in accordance with examples as disclosed herein. In some examples, aspects of the operations of 1825 may be performed by an SSB indicator component 1135 as described with reference to FIG. 11. Additionally, or alternatively, means for performing 1825 may, but not necessarily, include, for example, communications manager 1220, I/O controller 1210, transceiver 1215, antenna 1225, memory 1230, code 1235, and processor 1240.

Figure 19:
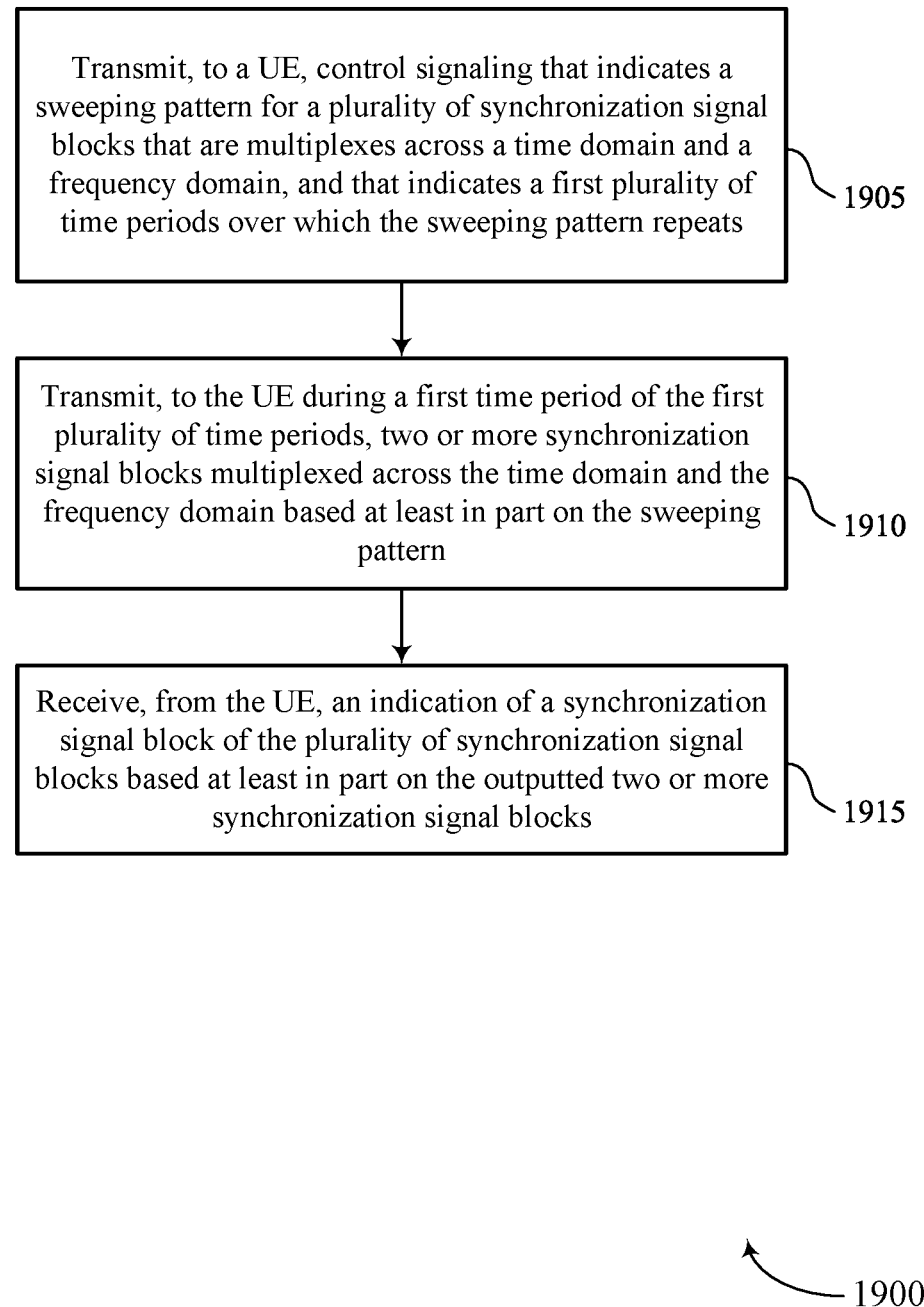

FIG. 19 shows a flowchart illustrating a method 1900 that supports SSB repetition in frequency domain in accordance with one or more aspects of the present disclosure. The operations of the method 1900 may be implemented by a network entity or its components as described herein. For example, the operations of the method 1900 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1905, the method may include transmitting, to a UE, control signaling that indicates a sweeping pattern for a set of multiple SSBs that are multiplexed across a time domain and a frequency domain, and that indicates a first set of multiple time periods over which the sweeping pattern repeats. The operations of 1905 may be performed in accordance with examples as disclosed herein. In some examples, aspects of the operations of 1905 may be performed by a sweeping pattern component 1525 as described with reference to FIG. 15. Additionally, or alternatively, means for performing 1905 may, but not necessarily, include, for example, communications manager 1620, transceiver 1610, antenna 1615, memory 1625, code 1630, and processor 1635.

At 1910, the method may include transmitting, to the UE during a first time period of the first set of multiple time periods, two or more SSBs multiplexed across the time domain and the frequency domain based on the sweeping pattern. The operations of 1910 may be performed in accordance with examples as disclosed herein. In some examples, aspects of the operations of 1910 may be performed by a multiplexor component 1530 as described with reference to FIG. 15. Additionally, or alternatively, means for performing 1910 may, but not necessarily, include, for example, communications manager 1620, transceiver 1610, antenna 1615, memory 1625, code 1630, and processor 1635.

At 1915, the method may include receiving, from the UE, an indication of a SSB of the set of multiple SSBs based on the two or more SSBs. The operations of 1915 may be performed in accordance with examples as disclosed herein. In some examples, aspects of the operations of 1915 may be performed by an SSB indicator component 1535 as described with reference to FIG. 15. Additionally, or alternatively, means for performing 1915 may, but not necessarily, include, for example, communications manager 1620, transceiver 1610, antenna 1615, memory 1625, code 1630, and processor 1635.

Figure 20:
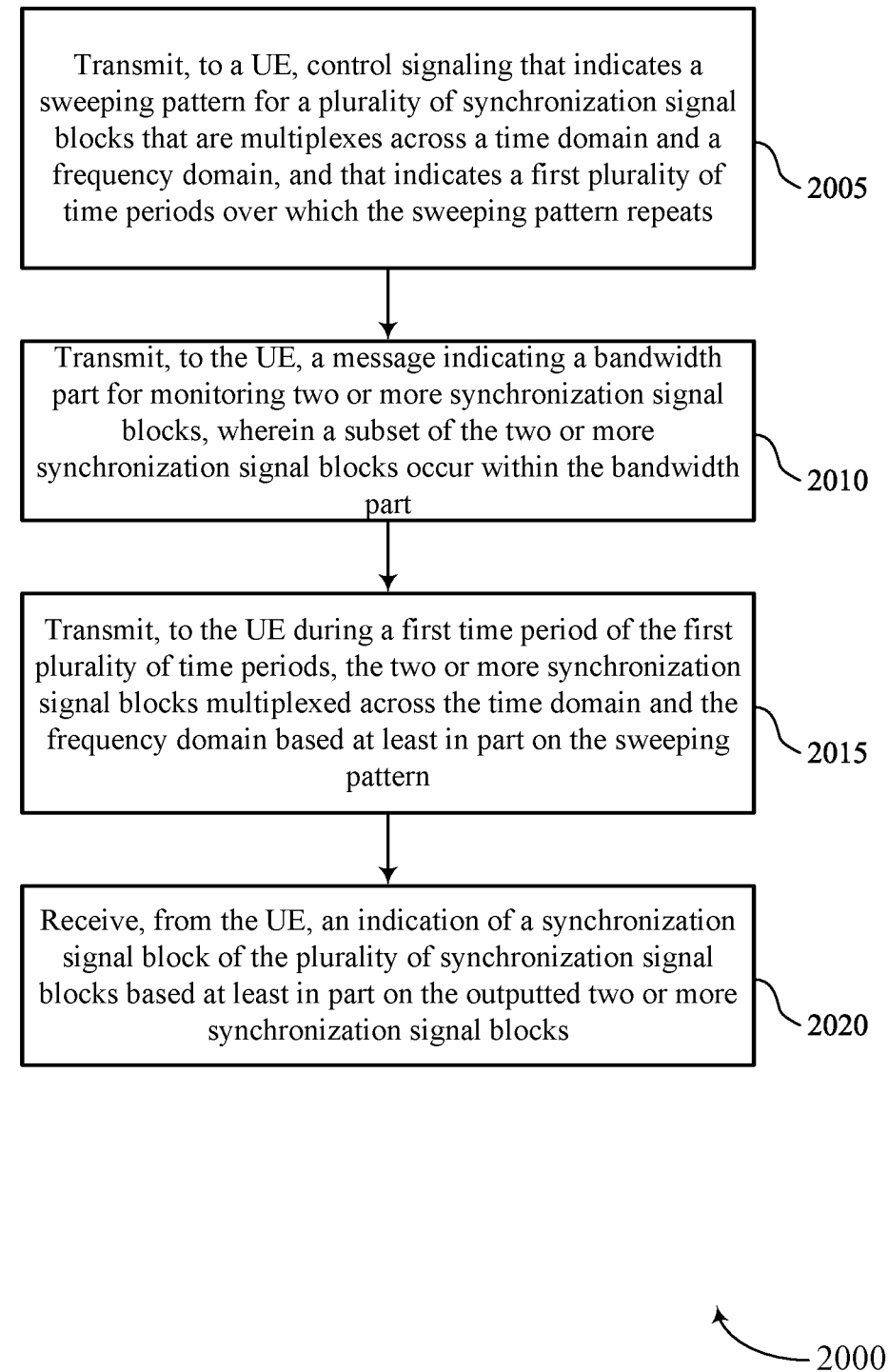

FIG. 20 shows a flowchart illustrating a method 2000 that supports SSB repetition in frequency domain in accordance with one or more aspects of the present disclosure. The operations of the method 2000 may be implemented by a network entity or its components as described herein. For example, the operations of the method 2000 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2005, the method may include transmitting, to a UE, control signaling that indicates a sweeping pattern for a set of multiple SSBs that are multiplexed across a time domain and a frequency domain, and that indicates a first set of multiple time periods over which the sweeping pattern repeats. The operations of 2005 may be performed in accordance with examples as disclosed herein. In some examples, aspects of the operations of 2005 may be performed by a sweeping pattern component 1525 as described with reference to FIG. 15. Additionally, or alternatively, means for performing 2005 may, but not necessarily, include, for example, communications manager 1620, transceiver 1610, antenna 1615, memory 1625, code 1630, and processor 1635.

At 2010, the method may include transmitting, to the UE, a message indicating a bandwidth part for monitoring two or more SSBs, where a subset of the two or more SSBs occur within the bandwidth part. The operations of 2010 may be performed in accordance with examples as disclosed herein. In some examples, aspects of the operations of 2010 may be performed by a BWP component 1570 as described with reference to FIG. 15. Additionally, or alternatively, means for performing 2010 may, but not necessarily, include, for example, communications manager 1620, transceiver 1610, antenna 1615, memory 1625, code 1630, and processor 1635.

At 2015, the method may include transmitting, to the UE during a first time period of the first set of multiple time periods, the two or more SSBs multiplexed across the time domain and the frequency domain based on the sweeping pattern. The operations of 2015 may be performed in accordance with examples as disclosed herein. In some examples, aspects of the operations of 2015 may be performed by a multiplexor component 1530 as described with reference to FIG. 15. Additionally, or alternatively, means for performing 2015 may, but not necessarily, include, for example, communications manager 1620, transceiver 1610, antenna 1615, memory 1625, code 1630, and processor 1635.

At 2020, the method may include receiving, from the UE, an indication of a SSB of the set of multiple SSBs based on the two or more SSBs. The operations of 2020 may be performed in accordance with examples as disclosed herein. In some examples, aspects of the operations of 2020 may be performed by an SSB indicator component 1535 as described with reference to FIG. 15. Additionally, or alternatively, means for performing 2020 may, but not necessarily, include, for example, communications manager 1620, transceiver 1610, antenna 1615, memory 1625, code 1630, and processor 1635.

The following provides an overview of aspects of the present disclosure:

Aspect 1: A method for wireless communication at a UE, comprising: receiving, from a network entity, control signaling that indicates a sweeping pattern for a plurality of SSBs that are multiplexed across a time domain and a frequency domain, and that indicates a first plurality of time periods over which the sweeping pattern repeats; monitoring, during a first time period of the first plurality of time periods, two or more SSBs multiplexed across the time domain and the frequency domain in accordance with the sweeping pattern; and transmitting, to the network entity, an indication of a SSB of the plurality of SSBs based at least in part on the monitoring.

Aspect 2: The method of aspect 1, wherein receiving the control signaling comprises: receiving an indication of a first set of SSBs of the plurality of SSBs that are multiplexed across the time domain and the frequency domain in the first plurality of time periods and a second set of SSBs of the plurality of SSBs are multiplexed across the time domain in a second plurality of time periods.

Aspect 3: The method of any of aspects 1 through 2, wherein receiving the control signaling comprises: receiving an indication that a first SSB of the two or more SSBs is repeated during the first time period of the first plurality of time periods.

Aspect 4: The method of any of aspects 1 through 3, wherein receiving the control signaling comprises: receiving an indication of a muting pattern that indicates to mute a first SSB of the plurality of SSBs and to mute each repetition of the first SSB.

Aspect 5: The method of any of aspects 1 through 4, wherein receiving the control signaling comprises: receiving an indication of a muting pattern that indicates to mute a first SSB of the plurality of SSBs and to monitor for each repetition of the first SSB.

Aspect 6: The method of any of aspects 1 through 5, wherein receiving the control signaling comprises: receiving an indication of a muting pattern for a repetition of a first SSB of the plurality of SSBs.

Aspect 7: The method of any of aspects 1 through 6, further comprising: transmitting a random access message during one of a first random access occasion associated with a first SSB of the two or more SSBs or a second random access occasion associated with a repetition of the first SSB.

Aspect 8: The method of any of aspects 1 through 7, further comprising: transmitting a random access message during a random access occasion that is associated with each of a first SSB of the two or more SSBs and a repetition of the first SSB.

Aspect 9: The method of any of aspects 1 through 8, wherein receiving the control signaling comprises: receiving, from the network entity of a first cell, the control signaling associated with a second network entity of a second cell, wherein the control signaling indicates a number of SSB repetitions, a periodicity of SSB repetitions, a muting pattern, or any combination thereof.

Aspect 10: The method of any of aspects 1 through 9, further comprising: receiving, from the network entity, a message indicating a bandwidth part for monitoring the two or more SSBs; and monitoring a subset of the two or more SSBs that occur within the bandwidth part.

Aspect 11: A method for wireless communication at a network entity, comprising: transmitting, to a UE, control signaling that indicates a sweeping pattern for a plurality of SSBs that are multiplexed across a time domain and a frequency domain, and that indicates a first plurality of time periods over which the sweeping pattern repeats; transmitting, to the UE during a first time period of the first plurality of time periods, two or more SSBs multiplexed across the time domain and the frequency domain based at least in part on the sweeping pattern; and receiving, from the UE, an indication of a SSB of the plurality of SSBs based at least in part on the outputted two or more SSBs.

Aspect 12: The method of aspect 11, wherein transmitting the control signaling comprises: transmitting an indication of a first set of SSBs of the plurality of SSBs that are multiplexed across the time domain and the frequency domain in the first plurality of time periods and a second set of SSBs of the plurality of SSBs are multiplexed across the time domain in a second plurality of time periods.

Aspect 13: The method of any of aspects 11 through 12, wherein transmitting the control signaling comprises: transmitting an indication that a first SSB of the two or more SSBs is repeated during the first time period of the first plurality of time periods.

Aspect 14: The method of any of aspects 11 through 13, wherein transmitting the control signaling comprises: transmitting an indication of a muting pattern that indicates to mute a first SSB of the plurality of SSBs and to mute each repetition of the first SSB.

Aspect 15: The method of any of aspects 11 through 14, wherein transmitting the control signaling comprises: transmitting an indication of a muting pattern that indicates to mute a first SSB of the plurality of SSBs and to monitor for each repetition of the first SSB.

Aspect 16: The method of any of aspects 11 through 15, wherein transmitting the control signaling comprises: transmitting an indication of a muting pattern for a repetition of a first SSB of the plurality of SSBs.

Aspect 17: The method of any of aspects 11 through 16, further comprising: receiving a random access message during one of a first random access occasion associated with a first SSB of the two or more SSBs or a second random access occasion associated with a repetition of the first SSB.

Aspect 18: The method of any of aspects 11 through 17, further comprising: receiving a random access message during a random access occasion that is associated with each of a first SSB of the two or more SSBs and a repetition of the first SSB.

Aspect 19: The method of any of aspects 11 through 18, further comprising: performing a rest procedure for a set of time periods preceded by the first time period based at least in part on the two or more SSBs.

Aspect 20: The method of any of aspects 11 through 19, wherein transmitting the control signaling comprises: transmitting, from the network entity of a first cell, the control signaling associated with a second network entity of a second cell, wherein the control signaling indicates a number of SSB repetitions, a periodicity of SSB repetitions, a muting pattern, or any combination thereof.

Aspect 21: The method of any of aspects 11 through 20, further comprising: transmitting, to the UE, a message indicating a bandwidth part for monitoring the two or more SSBs, wherein a subset of the two or more SSBs occur within the bandwidth part.

Aspect 22: An apparatus for wireless communication at a UE, comprising a memory, transceiver, and at least one processor coupled with the memory and the transceiver, the at least one processor configured to perform a method of any of aspects 1 through 10.

Aspect 23: An apparatus for wireless communication at a UE, comprising at least one means for performing a method of any of aspects 1 through 10.

Aspect 24: A non-transitory computer-readable medium storing code for wireless communication at a UE, the code comprising instructions executable by a processor to perform a method of any of aspects 1 through 10.

Aspect 25: An apparatus for wireless communication at a network entity, comprising a memory and at least one processor coupled with the memory, the at least one processor configured to perform a method of any of aspects 11 through 21.

Aspect 26: An apparatus for wireless communication at a network entity, comprising at least one means for performing a method of any of aspects 11 through 21.

Aspect 27: A non-transitory computer-readable medium storing code for wireless communication at a network entity, the code comprising instructions executable by a processor to perform a method of any of aspects 11 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more memories;
   a transceiver; and
   one or more processors coupled with the one or more memories and the transceiver, the one or more processors configured to:
      receive, via the transceiver, from a network entity, control signaling that indicates a sweeping pattern for a plurality of synchronization signal blocks that are multiplexed across a time domain and a frequency domain, and that indicates a first plurality of time periods over which the sweeping pattern repeats, wherein the control signaling comprises an indication of a muting pattern that indicates to mute a first synchronization signal block of the plurality of synchronization signal blocks and to monitor for each repetition of the first synchronization signal block;
      monitor, during a first time period of the first plurality of time periods, two or more synchronization signal blocks multiplexed across the time domain and the frequency domain in accordance with the sweeping pattern such that at least one synchronization signal block and at least another, different synchronization signal block overlap during a same time but use different frequency resources; and
      transmit, via the transceiver, to the network entity, an indication of a synchronization signal block of the plurality of synchronization signal blocks based at least in part on the monitoring.

2. The apparatus of claim 1, wherein the one or more processors configured to receive the control signaling is further configured to:
   receive, via the transceiver, an indication of a first set of synchronization signal blocks of the plurality of synchronization signal blocks that are multiplexed across the time domain and the frequency domain in the first plurality of time periods and a second set of synchronization signal blocks of the plurality of synchronization signal blocks are multiplexed across the time domain in a second plurality of time periods.

3. The apparatus of claim 1, wherein the one or more processors configured to receive the control signaling is further configured to:
   receive, via the transceiver, an indication that a first synchronization signal block of the two or more synchronization signal blocks is repeated during the first time period of the first plurality of time periods.

4. The apparatus of claim 1, wherein the one or more processors configured to receive the control signaling is further configured to:
   receive, via the transceiver, a second indication of a second muting pattern that indicates to mute a second synchronization signal block of the plurality of synchronization signal blocks and to mute each repetition of the second synchronization signal block.

5. The apparatus of claim 1, wherein the one or more processors configured to receive the control signaling is further configured to:
   receive, via the transceiver, a second indication of a second muting pattern for a repetition of a second synchronization signal block of the plurality of synchronization signal blocks.

6. The apparatus of claim 1, the one or more processors further configured:
   transmit, via the transceiver, a random access message during one of a first random access occasion associated with a first synchronization signal block of the two or more synchronization signal blocks or a second random access occasion associated with a repetition of the first synchronization signal block.

7. The apparatus of claim 1, the at one or more processors further configured to:
   transmit, via the transceiver, a random access message during a random access occasion that is associated with each of a first synchronization signal block of the two or more synchronization signal blocks and a repetition of the first synchronization signal block.

8. The apparatus of claim 1, the one or more processors further configured to:
   receive, via the transceiver from the network entity, a message indicating a bandwidth part for monitoring the two or more synchronization signal blocks; and
   monitor a subset of the two or more synchronization signal blocks that occur within the bandwidth part.

9. An apparatus for wireless communication at a user equipment (UE), comprising:
   one or more memories;
   a transceiver; and
   one or more processors coupled with the one or more memories and the transceiver, the one or more processors configured to:
      receive, via the transceiver from a network entity of a first cell, control signaling that indicates a sweeping pattern for a plurality of synchronization signal blocks that are multiplexed across a time domain and a frequency domain, and that indicates a first plurality of time periods over which the sweeping pattern repeats, wherein the control signaling is associated with a second network entity of a second cell, and wherein the control signaling indicates a number of synchronization signal block repetitions, a periodicity of synchronization signal block repetitions, a muting pattern, or any combination thereof;
      monitor, during a first time period of the first plurality of time periods, two or more synchronization signal blocks multiplexed across the time domain and the frequency domain in accordance with the sweeping pattern such that at least one synchronization signal block and at least another, different synchronization signal block overlap during a same time but use different frequency resources; and
      transmit, via the transceiver, to the network entity, an indication of a synchronization signal block of the plurality of synchronization signal blocks based at least in part on the monitoring.

10. An apparatus for wireless communication at a network entity, comprising:
    one or more memories; and
    one or more processors coupled with the one or more memories, the one or more processors configured to:
       transmit, to a user equipment (UE), control signaling that indicates a sweeping pattern for a plurality of synchronization signal blocks that are multiplexed across a time domain and a frequency domain, and that indicates a first plurality of time periods over which the sweeping pattern repeats, wherein the control signaling comprises an indication of a muting pattern that indicates to mute a first synchronization signal block of the plurality of synchronization signal blocks and to monitor for each repetition of the first synchronization signal block;
       transmit, to the UE during a first time period of the first plurality of time periods, two or more synchronization signal blocks multiplexed across the time domain and the frequency domain based at least in part on the sweeping pattern such that at least one synchronization signal block and at least another, different synchronization signal block overlap during a same time but use different frequency resources; and
       receive, from the UE, an indication of a synchronization signal block of the plurality of synchronization signal blocks based at least in part on the two or more synchronization signal blocks.

11. The apparatus of claim 10, wherein the one or more processors configured to transmit the control signaling is further configured to:
    transmit an indication of a first set of synchronization signal blocks of the plurality of synchronization signal blocks that are multiplexed across the time domain and the frequency domain in the first plurality of time periods and a second set of synchronization signal blocks of the plurality of synchronization signal blocks are multiplexed across the time domain in a second plurality of time periods.

12. The apparatus of claim 10, wherein the one or more processors configured to transmit the control signaling is further configured to:
    transmit an indication that a first synchronization signal block of the two or more synchronization signal blocks is repeated during the first time period of the first plurality of time periods.

13. The apparatus of claim 10, wherein the one or more processors configured to transmit the control signaling is further configured to:
    transmit a second indication of a second muting pattern that indicates to mute a second synchronization signal block of the plurality of synchronization signal blocks and to mute each repetition of the second synchronization signal block.

14. The apparatus of claim 10, wherein the one or more processors configured to transmit the control signaling is further configured to:
    transmit a second indication of a second muting pattern for a repetition of a second synchronization signal block of the plurality of synchronization signal blocks.

15. The apparatus of claim 10, the one or more processors further configured to:
    receive a random access message during one of a first random access occasion associated with a first synchronization signal block of the two or more synchronization signal blocks or a second random access occasion associated with a repetition of the first synchronization signal block.

16. The apparatus of claim 10, the one or more processors further configured to:
    receive a random access message during a random access occasion that is associated with each of a first synchronization signal block of the two or more synchronization signal blocks and a repetition of the first synchronization signal block.

17. The apparatus of claim 10, the one or more processors further configured to:
    perform a rest procedure for a set of time periods preceded by the first time period based at least in part on the two or more synchronization signal blocks.

18. An apparatus for wireless communication at a network entity, comprising:
one or more memories; and
one or more processors coupled with the one or more memories, the one or more processors configured to:
transmit, from the network entity of a first cell to a user equipment (UE), control signaling that indicates a sweeping pattern for a plurality of synchronization signal blocks that are multiplexed across a time domain and a frequency domain, and that indicates a first plurality of time periods over which the sweeping pattern repeats, wherein the control signaling is associated with a second network entity of a second cell, and wherein the control signaling indicates a number of synchronization signal block repetitions, a periodicity of synchronization signal block repetitions, a muting pattern, or any combination thereof;
transmit, to the UE during a first time period of the first plurality of time periods, two or more synchronization signal blocks multiplexed across the time domain and the frequency domain based at least in part on the sweeping pattern such that at least one synchronization signal block and at least another, different synchronization signal block overlap during a same time but use different frequency resources; and
receive, from the UE, an indication of a synchronization signal block of the plurality of synchronization signal blocks based at least in part on the two or more synchronization signal blocks.

19. The apparatus of claim 10, the one or more processors further configured to:
transmit, to the UE, a message indicating a bandwidth part for monitoring the two or more synchronization signal blocks, wherein a subset of the two or more synchronization signal blocks occur within the bandwidth part.

20. A method for wireless communication at a user equipment (UE), comprising:
receiving, from a network entity, control signaling that indicates a sweeping pattern for a plurality of synchronization signal blocks that are multiplexed across a time domain and a frequency domain, and that indicates a first plurality of time periods over which the sweeping pattern repeats, wherein the control signaling comprises an indication of a muting pattern that indicates to mute:
a first synchronization signal block of the plurality of synchronization signal blocks and to mute each repetition of the first synchronization signal block,
the first synchronization signal block of the plurality of synchronization signal blocks and to monitor for each repetition of the first synchronization signal block,
a repetition of the first synchronization signal block of the plurality of synchronization signal blocks, or
any combination thereof;
monitoring, during a first time period of the first plurality of time periods, two or more synchronization signal blocks multiplexed across the time domain and the frequency domain in accordance with the sweeping pattern such that at least one synchronization signal block and at least another, different synchronization signal block overlap during a same time but use different frequency resources; and
transmitting, to the network entity, an indication of a synchronization signal block of the plurality of synchronization signal blocks based at least in part on the monitoring.

21. The method of claim 20, wherein receiving the control signaling comprises:
receiving an indication of a first set of synchronization signal blocks of the plurality of synchronization signal blocks that are multiplexed across the time domain and the frequency domain in the first plurality of time periods and a second set of synchronization signal blocks of the plurality of synchronization signal blocks are multiplexed across the time domain in a second plurality of time periods.

22. The method of claim 20, wherein receiving the control signaling comprises:
receiving an indication that a first synchronization signal block of the two or more synchronization signal blocks is repeated during the first time period of the first plurality of time periods.

23. A method for wireless communication at a network entity, comprising:
transmitting, to a user equipment (UE), control signaling that indicates a sweeping pattern for a plurality of synchronization signal blocks that are multiplexed across a time domain and a frequency domain, and that indicates a first plurality of time periods over which the sweeping pattern repeats, wherein the control signaling comprises an indication of a muting pattern that indicates to mute:
a first synchronization signal block of the plurality of synchronization signal blocks and to mute each repetition of the first synchronization signal block,
the first synchronization signal block of the plurality of synchronization signal blocks and to monitor for each repetition of the first synchronization signal block,
a repetition of the first synchronization signal block of the plurality of synchronization signal blocks,
or any combination thereof;
transmitting, to the UE during a first time period of the first plurality of time periods, two or more synchronization signal blocks multiplexed across the time domain and the frequency domain based at least in part on the sweeping pattern such that at least one synchronization signal block and at least another, different synchronization signal block overlap during a same time but use different frequency resources; and
receiving, from the UE, an indication of a synchronization signal block of the plurality of synchronization signal blocks based at least in part on the two or more synchronization signal blocks.

24. The method of claim 23, wherein transmitting the control signaling comprises:
transmitting an indication of a first set of synchronization signal blocks of the plurality of synchronization signal blocks that are multiplexed across the time domain and the frequency domain in the first plurality of time periods and a second set of synchronization signal blocks of the plurality of synchronization signal blocks are multiplexed across the time domain in a second plurality of time periods.

25. The method of claim 23, wherein transmitting the control signaling comprises:
  transmitting an indication that a first synchronization signal block of the two or more synchronization signal blocks is repeated during the first time period of the first plurality of time periods.

26. The method of claim 23, further comprising:
  performing a rest procedure for a set of time periods preceded by the first time period based at least in part on the two or more synchronization signal blocks.

* * * * *